US007848303B2

(12) United States Patent
Lindstrom et al.

(10) Patent No.: US 7,848,303 B2
(45) Date of Patent: Dec. 7, 2010

(54) SATELLITE MULTI-CHOICE SWITCH SYSTEM

(75) Inventors: Mats Lindstrom, San Diego, CA (US);
Reza Moazzam, San Diego, CA (US);
James Moniz, Groton, MA (US)

(73) Assignee: NXP B.V., Eindhoven (NL)

( * ) Notice: Subject to any disclaimer, the term of this patent is extended or adjusted under 35 U.S.C. 154(b) by 1030 days.

(21) Appl. No.: 11/026,670

(22) Filed: Dec. 31, 2004

(65) Prior Publication Data

US 2005/0193419 A1    Sep. 1, 2005

Related U.S. Application Data

(63) Continuation-in-part of application No. 10/611,400, filed on Jun. 30, 2003.

(60) Provisional application No. 60/534,176, filed on Dec. 31, 2003, provisional application No. 60/590,025, filed on Jul. 20, 2004.

(51) Int. Cl.
*H04J 1/00*    (2006.01)

(52) U.S. Cl. .................... 370/343; 370/481; 370/545; 725/71; 725/151; 455/3.02; 455/427

(58) Field of Classification Search ............... 370/343, 370/340, 310, 480, 481, 486, 487; 455/3.02, 455/3.01, 427, 103, 137
See application file for complete search history.

(56) References Cited

U.S. PATENT DOCUMENTS

| | | |
|---|---|---|
| 5,504,816 A | 4/1996 | Hamilton et al. |
| 5,764,113 A | 6/1998 | Snell |
| 5,923,642 A | 7/1999 | Young |
| 6,011,950 A | 1/2000 | Young |
| 6,363,033 B1 | 3/2002 | Cole et al. |
| 6,459,427 B1 | 10/2002 | Mao et al. |
| 6,590,515 B1 | 7/2003 | Dacy et al. |
| 6,768,434 B1 | 7/2004 | Gumm |
| 6,771,710 B1 | 8/2004 | Myers |
| 7,002,898 B1 | 2/2006 | Lou |
| 7,130,576 B1 * | 10/2006 | Gurantz et al. ............. 455/3.02 |

(Continued)

OTHER PUBLICATIONS

HSP45116A data sheet "Numerically Controlled Oscillator / Modulator"; Apr. 1999; pp. 3-1-to-3-17; http://www.intersil.com/data/fn/fn4156.pdf.

(Continued)

*Primary Examiner*—Donald L Mills
*Assistant Examiner*—Henry Baron

(57) ABSTRACT

A Multi-carrier Switch Converter ("MCSC") for multiplexing a plurality of input signals received at the MCSC into a single MCSC output signal is disclosed. The MCSC may include a Multi-port Selector Switch, wherein the Multi-port Selector Switch receives the plurality of input signals and produces a Multi-port Selector Switch output, wherein the Multi-port Selector Switch output includes a plurality of switched output signals and a frequency translation block in signal communication with the Multi-port Selector Switch, wherein the frequency translation block receives the Multi-port Selector Switch output and frequency translates each switched output signal of the plurality of switched output signals to plurality of translated signals, wherein each translated signal has a fixed carrier frequency. Additionally, the MCSC may include a combiner in signal communication with frequency translation block, wherein the combiner receives the plurality of frequency translated signals and combines them to produce the single MCSC signal.

60 Claims, 15 Drawing Sheets

U.S. PATENT DOCUMENTS

2002/0181604 A1  12/2002  Chen
2003/0039321 A1   2/2003  Lee et al.
2004/0142667 A1   7/2004  Lochhead et al.
2004/0161031 A1   8/2004  Kwentus et al.
2006/0259937 A1  11/2006  Fries

OTHER PUBLICATIONS

IRT 1000 Integrated Receiver Transcoder. Installation and Operation Manual 1996, pp. 1-1 to 2-12.
STMicroelectronics, "STVO399 Front-End Single Chip for Digital Satellite Broadcasting", 2001, p. 1.

* cited by examiner

SATELLITE MULTI-CHOICE SWITCH SYSTEM

CROSS REFERENCE TO EARLIER-FILED APPLICATIONS

This application is continuation-in-part of U.S. patent application Ser. No. 10/611,400, titled "Satellite Transcoder," filed Jun. 30, 2003, which is herein incorporated by reference in its entirety.

This application claims priority under 35 U.S.C. Section 119(e) to U.S. Provisional Application Ser. No. 60/534,176 titled "Satellite Multi-Choice Switch System," filed Dec. 31, 2003, and U.S. Provisional Application Ser. No. 60/590,025 titled "Satellite Multi-Choice Switch System," filed Jul. 20, 2004, both of which applications are incorporated herein, in their entirety, by this reference.

BACKGROUND OF THE INVENTION

1. Field of the Invention

This invention relates generally to satellite communication systems. In particular, this invention relates to a switching system for distributing one or more satellite signals to multiple set-top boxes ("STB").

2. Related Art

From the inception of convenient direct broadcast satellite ("DBS") services such as those offered DBS service providers DirectTV® and DISH Network® in the United States and similar services around the world, there has been a tremendous growth in the number of DBS subscribers. As more subscribers enroll in DBS services, DBS service providers are offering a greater number of services including, but not limited to, addition pay-per view, high definition television ("HDTV"), broadband Internet, satellite radio transmission, and other bandwidth-intensive services. As such, DBS providers require higher throughput to offer these bandwidth-intensive services to their growing number of subscribers.

Typically, the DBS providers are distributing these services among multiple satellites. As a result, this distribution of services or programming among multiple satellites typically requires the installation of one or more satellite antennas (typically known as a "dish" antenna when a reflector antenna such as a parabolic antenna is utilized) in combination with one or more low-noise block downconverters (also known as low-noise blocks "LNBs").

Until recently, most DBS systems have not allowed multiple STBs to operate in combination with one or more satellite antennas because usually a STB has some intelligence (i.e., it has a processor that runs control software) that controls the LNB based on the channels the STB wants. FIG. 1 shows an example implementation of prior art DBS system 100 in signal communication with a video monitor 102. The DBS system 100 may include a satellite antenna 104, LNB 106 and a STB 108.

The video monitor 102 may be any device capable of receiving the information delivered by the STB 108. Examples of the video monitor 102 may include a television set, a television monitor (without a television receiver), a computer monitor, and/or a video recording device. The STB 108 may be any generally known STB similar to the STBs produced by multiple manufacturers for both DirectTV® and DISH Network®, or other similar types of DBS service provider. Typically the STB 108 is generally known as an Integrated Receiver Decoder ("IRD"), which is a satellite receiver with a built-in decoder for unscrambling subscription channels broadcast by the DBS system provider.

It is appreciated by those skilled in the art that the satellite antenna 104 and LNB 106 are packaged usually together as one unit and the LNB is typically an active device. Examples of the satellite antenna 104 may include an 18-inch reflector antenna (typically know as a "dish antenna") or any other type of antenna such as a phased array, patch, and/or active or passive antenna. The LNB 106 is generally an amplifier that blocks low-end frequencies and receives the high-end frequencies used in digital satellite transmissions. In many DBS systems utilizing a reflector antenna, the LNB is generally located at the end of the arm projecting from the satellite antenna 104. Typically, a single-output LNB provides one RF output for connecting a coaxial cable to feed the received digital satellite signal to a single STB. A dual-output LNB typically has two RF outputs for distributing satellite signals to two or more STB.

In operation a DBS system, such as DirectTV® and DISH Network®, typically broadcasts each channel from their satellites with either a "left-hand" (known as left-handed circular polarization or "LHCP") or "right-hand" (known as right-handed circular polarization or "RHCP") circular polarization. Approximately, half the channels are broadcast with one polarization while the other channels are broadcast with the opposite polarization. Generally, the LNB 106 is capable of only receiving one type of polarization at a time and the STB 108 has an internal memory that contains a table of values (that is typically downloaded from the satellite) that represent the polarization of each channel. The STB 108 then instructs the LNB 106, via signal path 110 (which may be a standard coaxial cable), to switch to the polarization that corresponds to the desired channel of the STB 108. The STB 108 may instruct the LNB 106 to switch between polarizations by placing a variable voltage on the signal path 110.

As a result, the DBS system 100 does not allow multiple STBs to operate on one coaxial cable from the satellite antenna 104 and LNB 106 combination because multiple STBs would not be able to coordinate switching the polarization of the LNB 106. The polarization of a channel selection of one STB would interfere with the polarization of another channel selection on the other STB.

In home environment this is a drawback of DBS systems compared to, as an example, standard non-DBS cable systems. In standard non-DBS cable systems, a cable provider transmits the cable channels (whether analog, digital or combination of both) via one coaxial or fiber optic cable to a home. The residents of the home may then split the coaxial cable with a general-purpose splitter into multiple coaxial cables that are capable of feeding the transmitted cable channels into multiple video monitors via multiple cable receivers (or built-in television receivers within the video monitors). Each cable receiver is then capable of independently and simultaneously selecting different transmitted cable channels.

End-users in a home environment have become accustomed to connecting multiple video monitors and/or cable receivers to a common coaxial system that is the result of simply splitting the input coaxial cable from the cable system. It is appreciated that in a typical modern home almost every room will have a coaxial cable that extends from a wall outlet. All these cables will be connected to either an outside antenna or the cable system via a coaxial splitter.

As a result, end-users in a home environment expect or at least desire a similar convenience from an installed DBS system. Unfortunately, the DBS system 100 is not capable of allowing multiple STBs to connect to the LNB 106 and provide independent simultaneous channel reception by each individual STB.

Present attempts to solve this problem include utilizing multiple LNBs for each STB along with potentially utilizing multi-switches. Generally, DBS systems utilizing a dual LNB type reflector antenna may allow two independent STBs to simultaneously tune into different broadcast channels.

FIG. 2 shows an example implementation of a prior art DBS system 200 in signal communication with a first video monitor 202 and second video monitor 204. The DBS system 200 may include a first satellite antenna 206, second satellite antenna 208, first LNB 210, second LNB 212, first STB 214 and second STB 216. It is appreciated by those skilled in the art that the first satellite antenna 206, second satellite antenna 208, first LNB 210, and second LNB 212 may be incorporated into one dual mode antenna (not shown) such as, for example, a dual LNB antenna for use with DirectTV® and DISH Network®, respectively.

In operation, the first LNB 210 and second LNB 212 are capable of only receiving one type of polarization at a time and the first STB 214 and second STB 216 have internal memories containing tables of values (that are typically downloaded from the satellites) that represent the polarization of each channel. The first STB 214 then instructs the first LNB 210, via signal path 218 (which may be a standard coaxial cable), to switch to the polarization that corresponds to the desired channel of the first STB 214. Similarly, the second STB 216 then instructs the second LNB 212, via signal path 220 (which may again be a standard coaxial cable), to switch to the polarization that corresponds to the desired channel of the second STB 216. Both the first STB 214 and second STB 216 may respectively instruct the first LNB 210 and second LNB 212 to switch between polarizations by respectively placing a variable voltage on the signal paths 218 and 220.

As a result, the DBS system 200 allows the first STB 214 and second STB 216 to operate on two separate coaxial cables 218 and 220 from the first satellite antenna 206 and first LNB 210 and second satellite antenna 208 and second LNB 212 combinations. The first STB 214 and second STB 216 will be capable of independently and simultaneously tuning to separate channels because the first STB 214 and second STB 216 operate on separate independent coaxial cables 222 and 224. Thus, the first STB 214 and second STB 216 will be able to switch the polarization of the first LNB 210 and second LNB 212, respectively, without interfering with each other.

Additional attempts to solve this problem have also included utilizing multiple LNB coupled to multiple STBs via a multi-switch. Generally, DBS systems utilizing a dual LNB type reflector antenna and a multi-switch may allow two or more independent STBs to simultaneously tune into different broadcast channels.

FIG. 3 shows an example implementation of a prior art DBS system 300 in signal communication with multiple video monitors 302, 304 and 306. It is appreciated by those skilled in the art that while only three video monitors are shown, the example implementation is equally applicable to more than three video monitors. The DBS system 300 may include a first satellite antenna 308, second satellite antenna 310, first LNB 312, second LNB 314, multi-switch 316, first STB 318, second STB 320 and third STB 322. It is again appreciated by those skilled in the art that the first satellite antenna 308, second satellite antenna 310, first LNB 312, and second LNB 314 may be incorporated into one dual mode antenna (not shown) such as, for example, a dual LNB antenna for use with DirectTV® and DISH Network®, respectively. Again, it is appreciated by those skilled in the art that while only three STBs are shown, the example implementation is equally applicable to more than three STBs.

In operation, the first LNB 312 and second LNB 314 are capable of only receiving one type of polarization at a time and the first STB 318, second STB 320 and third STB 322 have internal memories containing tables of values (that are typically downloaded from the satellites) that represent the polarization of each channel. The Multi-Switch 316 is coupled to both the first LNB 312, via signal path 324, and second LNB 314, via signal path 326, and controls both by maintaining one LNB (such as, for example, the first LNB 312) in one polarization state (such as, for example, LHCP) and the other LNB (such as, for example, the second LNB 314) in another polarization state (such as, for example, RHCP). The Multi-Switch 316 is also coupled to a plurality of STBs (such as, for example, first STB 318, via signal path 328, second STB 320, via signal path 330, and third STB 322, via signal path 332) and switches an individual coupled STB to the corresponding LNB having the polarization desired by the individual STB.

In this example, when the first STB 318 instructs the Multi-Switch 316, via signal path 328 (which may be a standard coaxial cable), to switch to the polarization that corresponds to the desired channel of the first STB 318, the Multi-Switch 316 couples the first STB 318 to the LNB (either the first LNB 312 or second LNB 314) that is set to the corresponding polarization. Similarly, when the second STB 320 instructs the Multi-Switch 316, via signal path 330 (which again may be a standard coaxial cable), to switch to the polarization that corresponds to the desired channel of the second STB 320, the Multi-Switch 316 couples the second STB 320 to the LNB (either the first LNB 312 or second LNB 314) that is set to the corresponding polarization. Still similarly, when the third STB 322 instructs the Multi-Switch 316, via signal path 332 (which again may be a standard coaxial cable), to switch to the polarization that corresponds to the desired channel of the third STB 322, the Multi-Switch 316 couples the third STB 322 to the LNB (either the first LNB 312 or second LNB 314) that is set to the corresponding polarization.

Again, the first STB 318, second STB 320 and third STB 322 may respectively instruct the Multi-Switch 316 to switch between LRCP and LHCP polarizations by respectively placing a variable voltage on the signal paths 328, 330 and 332.

As a result, the DBS system 300 allows a plurality of STBs to operate on a plurality of separate coaxial cables from the first satellite antenna 308 and first LNB 312 and second satellite antenna 310 and second LNB 314 combinations via the Multi-Switch 316. The plurality of STBs will be capable of independently and simultaneously tuning to separate channels because the plurality of STBs operates on a plurality of separate independent coaxial cables. Thus, the plurality of STBs will be able to switch the polarization of the first LNB 312 and second LNB 314, via the Multi-Switch 316, without interfering with each other.

Unfortunately, the approaches described in FIGS. 1, 2, and 3 are multi-cable approaches that are high cost and cumbersome to arrange in the typical home environment because they include the increased cost of equipment such as multiple cables, multi-switch devices, combiners and splitters and the cost of labor in professionally installing the equipment. Once the equipment has been installed it is pseudo-permanent in nature because it is difficult to rearrange the equipment in the future. These approaches are still much more complicated than adding additional cable ready tuners in a home installed cable television system.

Therefore, there is a need for a system and method that provides a low cost solution for distributing DBS system signals on a signal cable from the DBS antenna to the home environment.

An example of a pervious attempt to solve this problem is shown in FIG. 4. The DBS system 400 is shown in signal communication with a first video monitor 402 and second video monitor 404. The DBS system may include a first STB 406, second STB 408, first satellite antenna 410, second satellite antenna 412, first LNB 414, second LNB 416, Multi-Switch 418, first mixer 420, second mixer 422, frequency reference 424, combiner 426 and splitter 428.

In operation, the DBS system 400 receives the DBS satellite signals via the combination of first satellite antenna 410 and first LNB 414, second antenna 412 and second LNB 416, and the Multi-Switch 418; however, it is appreciated that additional antennas and LNBs may also be utilized. The DBS system 400 then band translates the received satellite signals, via signal paths 430 and 432, with the first mixer 420 and second mixer 422 creating a low-band satellite signal 434 and high-band satellite signal 436. The low-band satellite signal 434 and high-band signal 436 are then combined, via combiner 426, on to one signal path 438 (typically a coaxial cable) that is later split by splitter 428. The splitter 428 then passes the combined signals transmitted on signal path 438 to both the first STB 406 and second STB 408 via signal paths 440 and 442, respectively. Both the first STB 406 and second STB 408 will need to be able to downconvert the received signals to frequency plan that allows both STBs to demodulate and decode the received signals so that the first video monitor 402 and second video monitor 404 are able to display the received channels. As a result, the DBS system 400 allows two STBs to operate independently on a single coaxial cable from the first satellite antenna 410 and first LNB 414 and second satellite antenna 412 and second LNB 416 combinations via the Multi-Switch 418.

FIG. 5 shows a graphical representation 500 of amplitude 502 versus frequency 504 in megahertz ("MHz") of an example frequency characteristic for both the low-band satellite signal 506 and high-band satellite signal 508. In this example, the low-band satellite signal 506 may occupy the 950 to 1,450 MHz frequency range, while the high-band satellite signal 508 may occupy the 1,650 to 2,150 MHz frequency range with a 200 MHz guard-band 510.

Unfortunately, a drawback to this approach is that it would only operate with two STB because only two frequency bands are supported. The DBS system 400 only translates the high frequency band to a low-band and the low frequency band to a high-band. As a result, one STB (such as the first STB 406) is only capable of receiving a high-band signal and the other STB (such as the second STB 408) is only capable of receiving a low-band signal. Additionally, filter devices (not shown) may be needed at both the first STB 406 and second STB 408 to filter out the undesired bands. Moreover, the DBS system 400 has very low selectivity and that does not allow fine-tuning of the received channels.

Therefore, there is a need for a system and method that provides a low cost solution for distributing DBS system signals on a signal cable from the DBS antenna to the home environment that is capable of supporting more than two STBs and has superior selectivity.

SUMMARY

A Multi-carrier Switch Converter ("MCSC") for multiplexing a plurality of input signals received at the MCSC into a single MCSC output signal is disclosed. The MCSC may include a Multi-port Selector Switch, wherein the Multi-port Selector Switch receives the plurality of input signals and produces a Multi-port Selector Switch output, wherein the Multi-port Selector Switch output includes a plurality of switched output signals and a frequency translation block in signal communication with the Multi-port Selector Switch, wherein the frequency translation block receives the Multi-port Selector Switch output and frequency translates each switched output signal of the plurality of switched output signals to plurality of translated signals, wherein each translated signal has a fixed carrier frequency. Additionally, the MCSC may include a combiner in signal communication with frequency translation block, wherein the combiner receives the plurality of frequency translated signals and combines them to produce the single MCSC signal.

The MCSC may operate by multiplexing a plurality of input signals received at the MCSC into a single MCSC output signal. As an example of operation, the MCSC may switch the plurality of input signals into a Multi-port Selector Switch output, wherein the Multi-port Selector Switch output includes a plurality of switched output signals and frequency translates each switched output signal of the plurality of switched output signals to plurality of translated signals, wherein each translated signal has a fixed carrier frequency. The MCSC may also combine the plurality of frequency translated signals to produce the single MCSC output signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

This invention discloses a Multi-carrier Switch Converter ("MCSC"). The MCSC is a system that allows several signals received from one or more satellite receiver LNBs in a DBS system to be combined and transported via a single cable to multiple satellite receiver tuner units, which are generally known as set-top boxes ("STB"). The MCSC frequency multiplexes the received satellite signals onto multiple carrier signals that may be combined into one combined signal where each carrier signal corresponds to a STB. As a result, the MCSC allows multiple video monitors to have access to several channels (from one or several satellites) simultaneously while at the same time reducing the number of required cables and other related equipment.

In general the MCSC operates by feeding the signals from several LNBs (after equalization) directly into a multi-port selector switch. The multi-port selector switch directs the signals to several mixers in several independent paths. The mixer in each path frequency shifts the input spectrum by a pre-specified local oscillator frequency. The local oscillator frequency in each path is pre-specified by a desired channel number. The frequency-shifted spectrum in each path is then fed to a filter, which may be a low-pass, high-pass, or band-pass filter. The filter limits the spectrum to the desired channel frequency band and the filter output signal from each path is combined with its counterparts from other paths (i.e., the signals are frequency multiplexed) and after some level adjustment by the automatic gain control ("AGC") unit (also known as an AGC circuit), the combined signal is fed into a cable and transported to the STBs.

Figure 1:
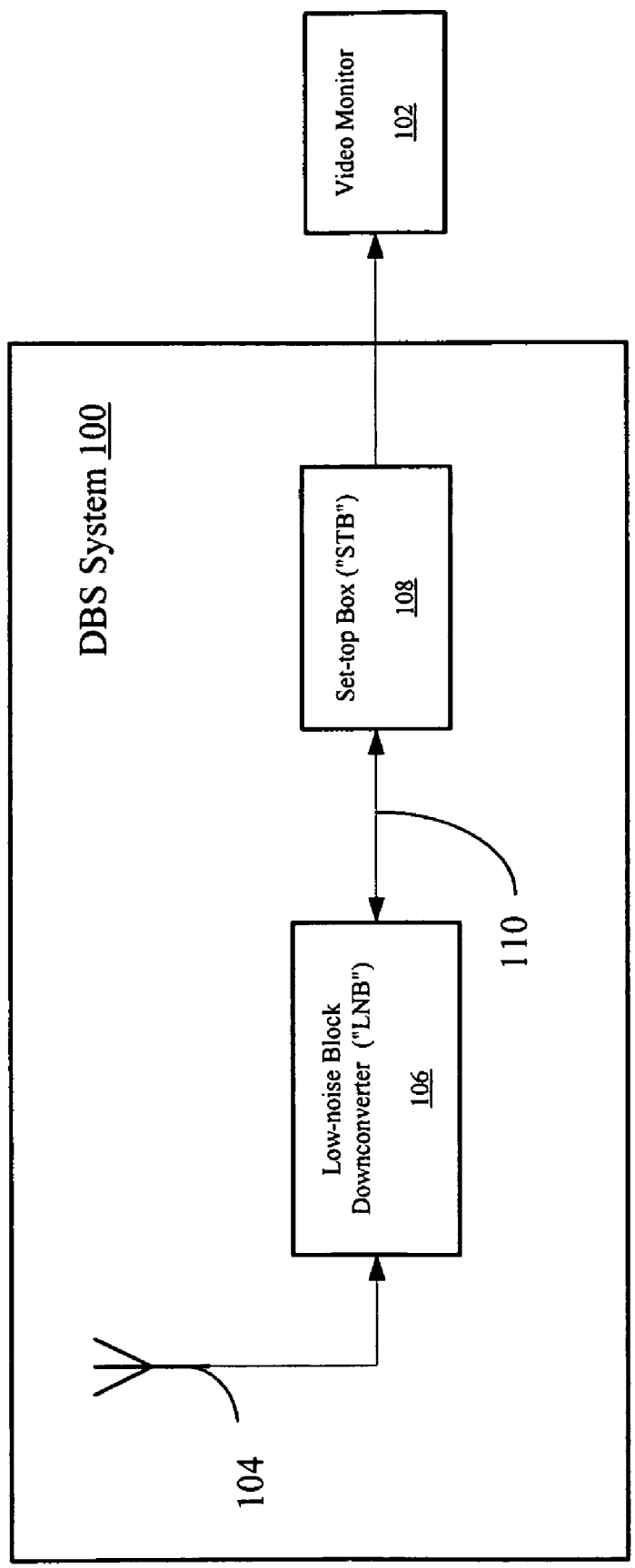
FIG. 1 is a block diagram of prior art DBS system in signal communication with a video monitor.
Figure 2:
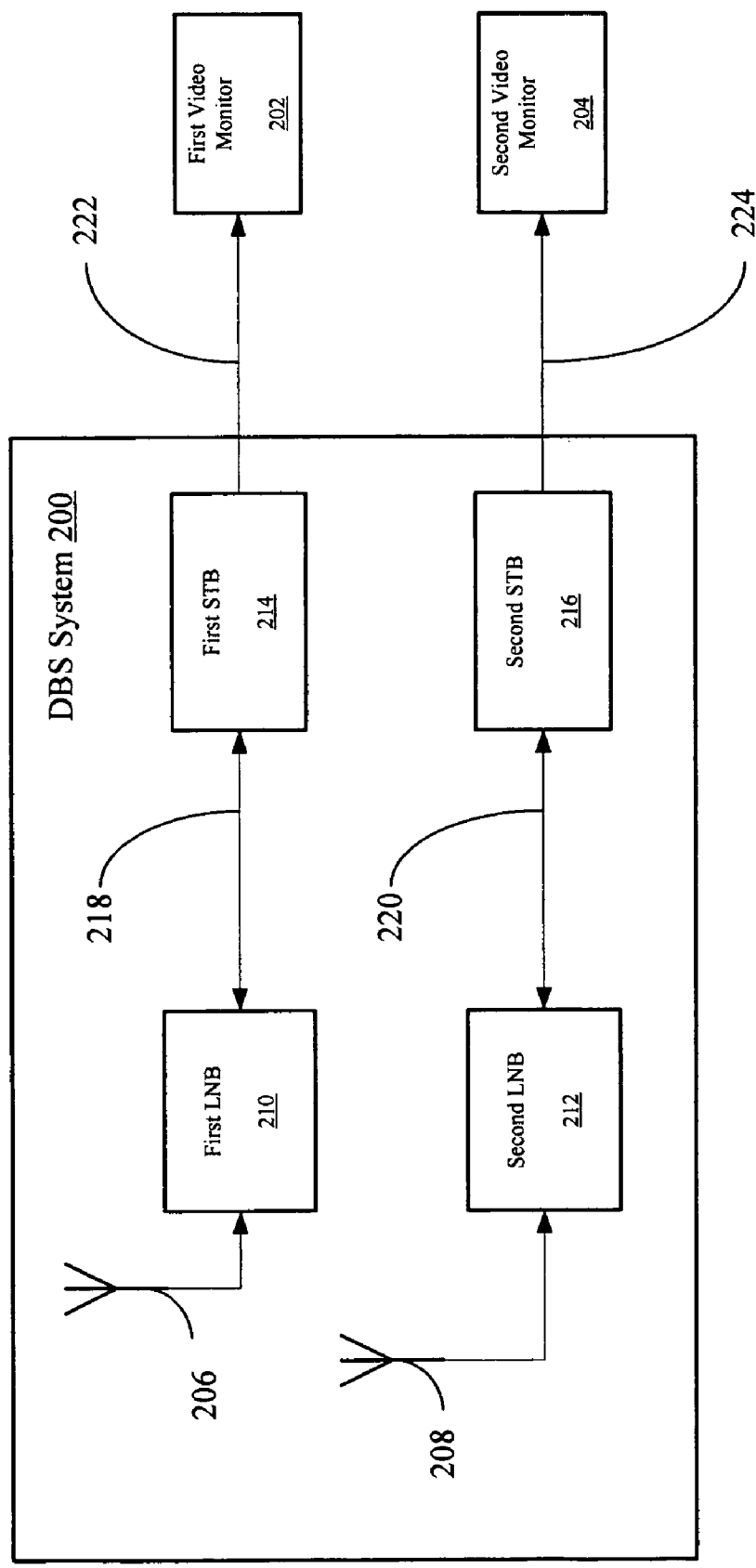
FIG. 2 is a block diagram of a prior art DBS system in signal communication with two video monitors.
Figure 3:
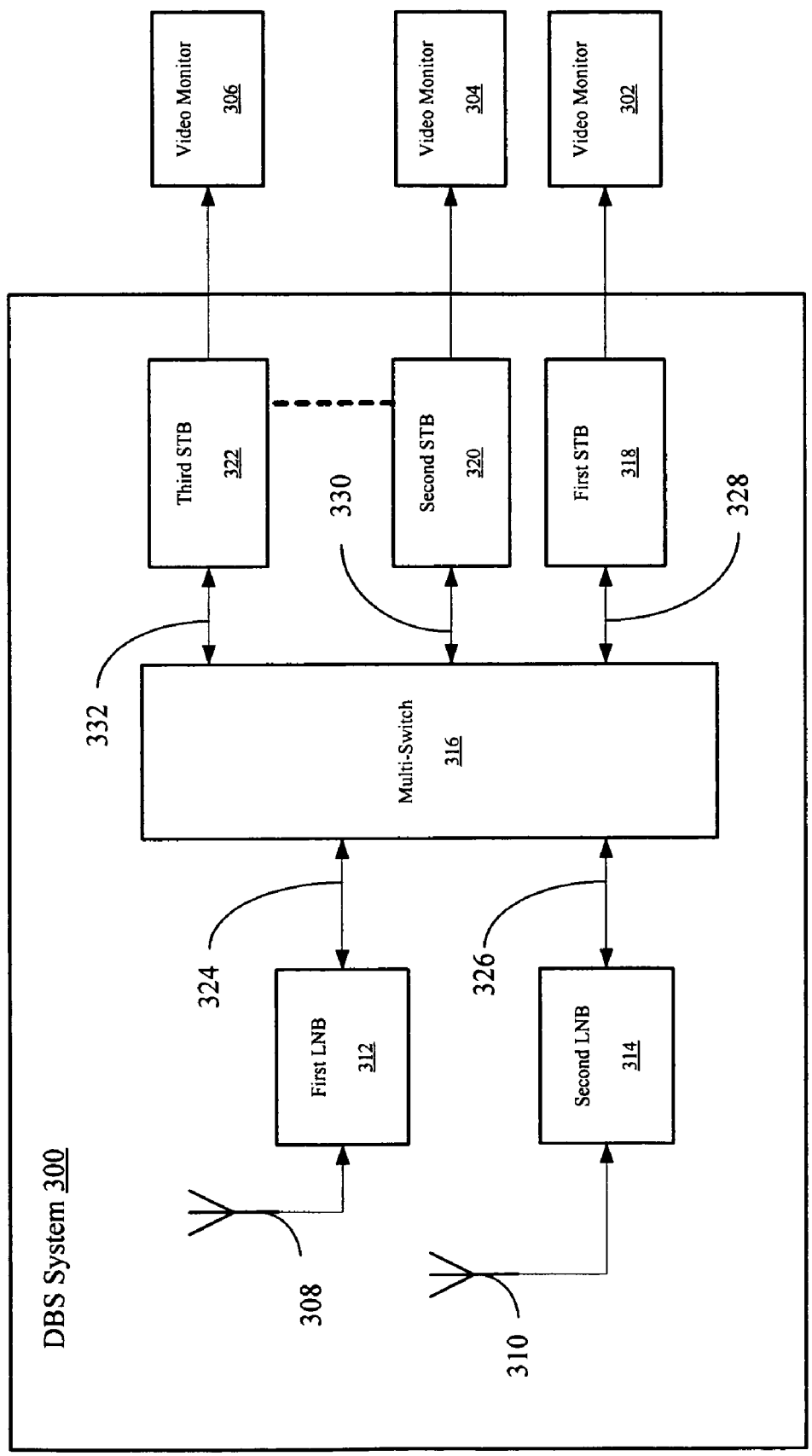
FIG. 3 is a block diagram of a prior art DBS system in signal communication with multiple video monitors.
Figure 4:
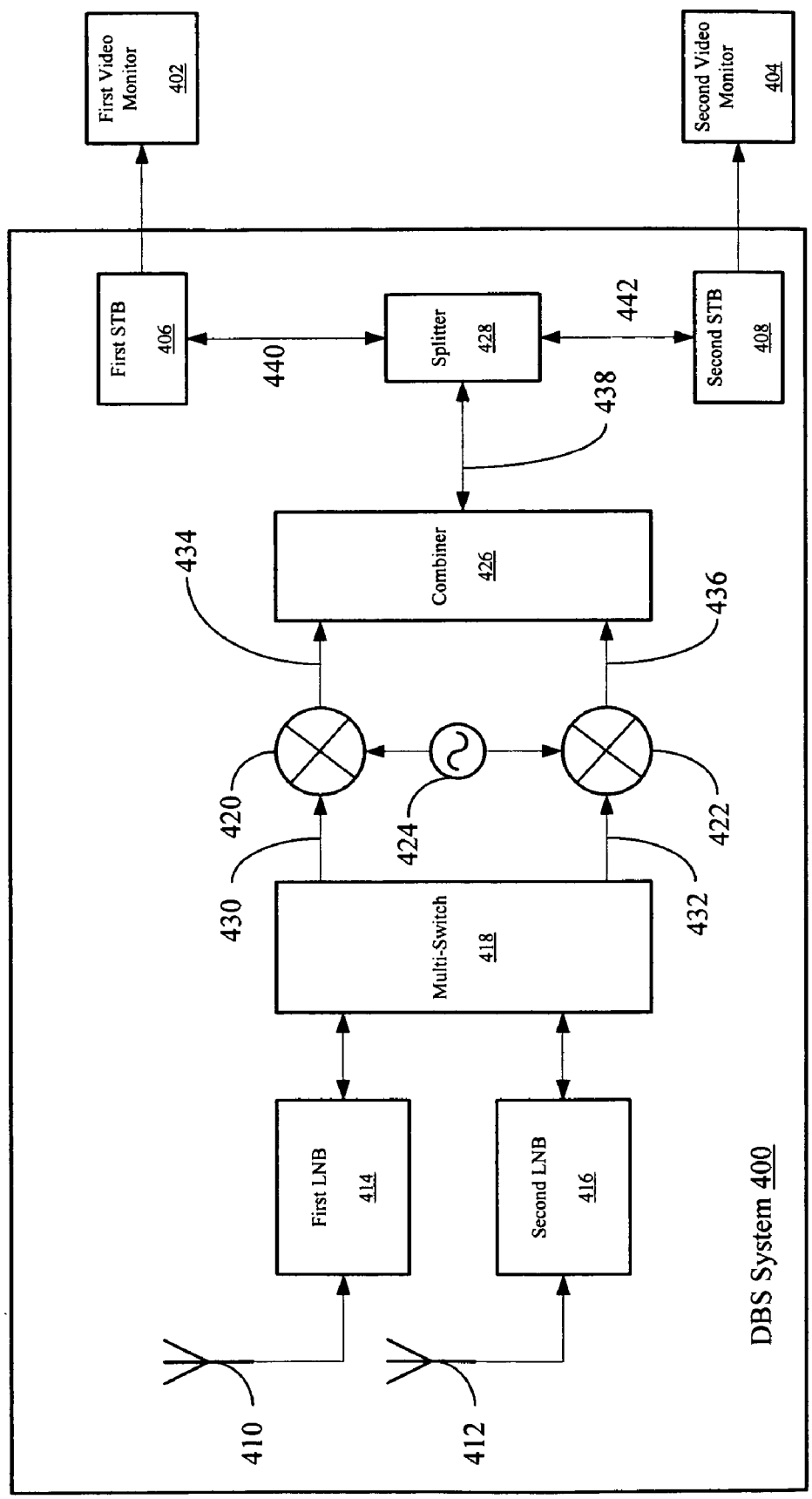
FIG. 4 is a block diagram of a prior art DBS system in signal communication with two video monitors.
Figure 5:
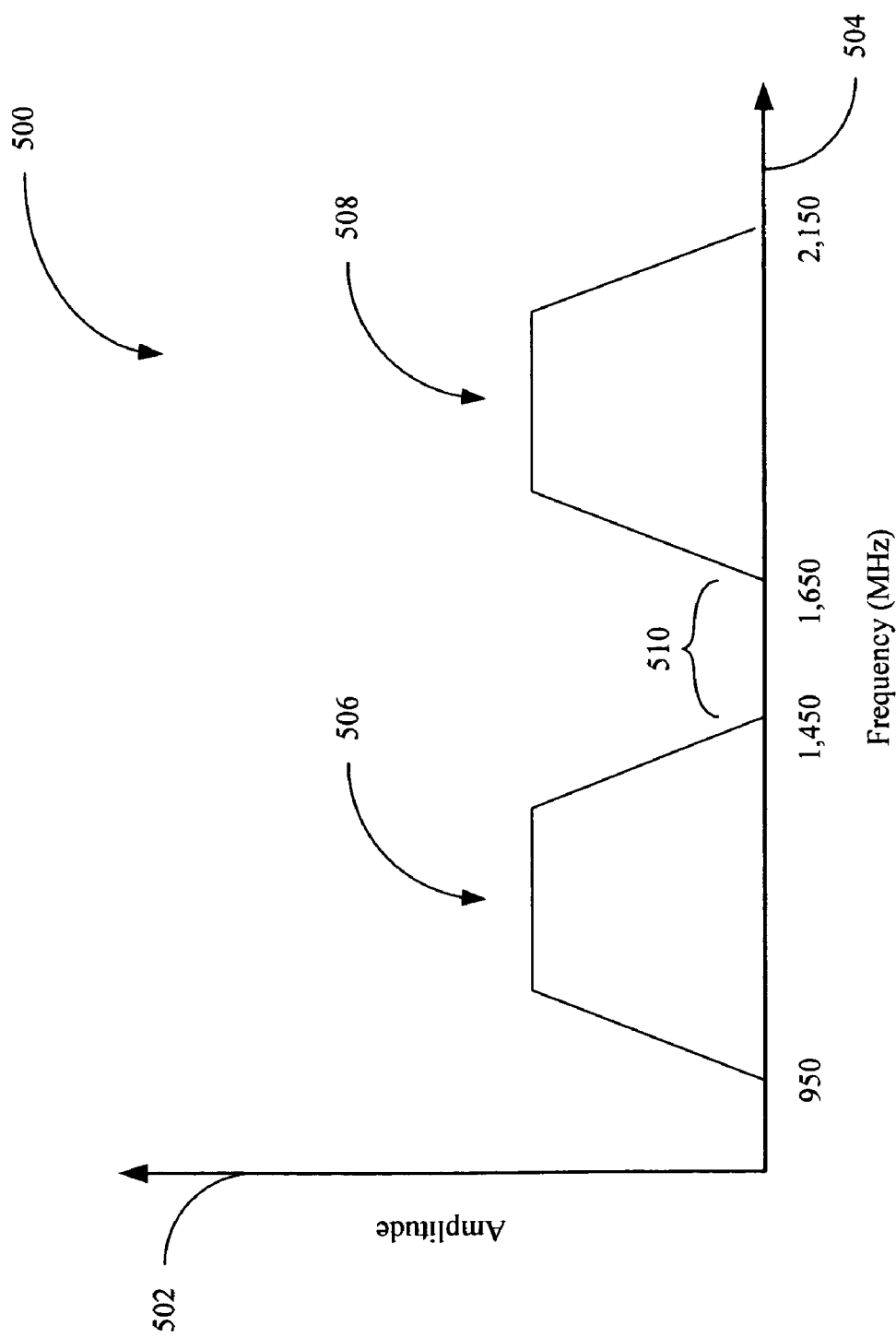
FIG. 5 is a plot showing a graphical representation of an example frequency characteristic for both a low-band satellite signal and high-band satellite signal produced by the DBS system shown in FIG. 4.
Figure 6:
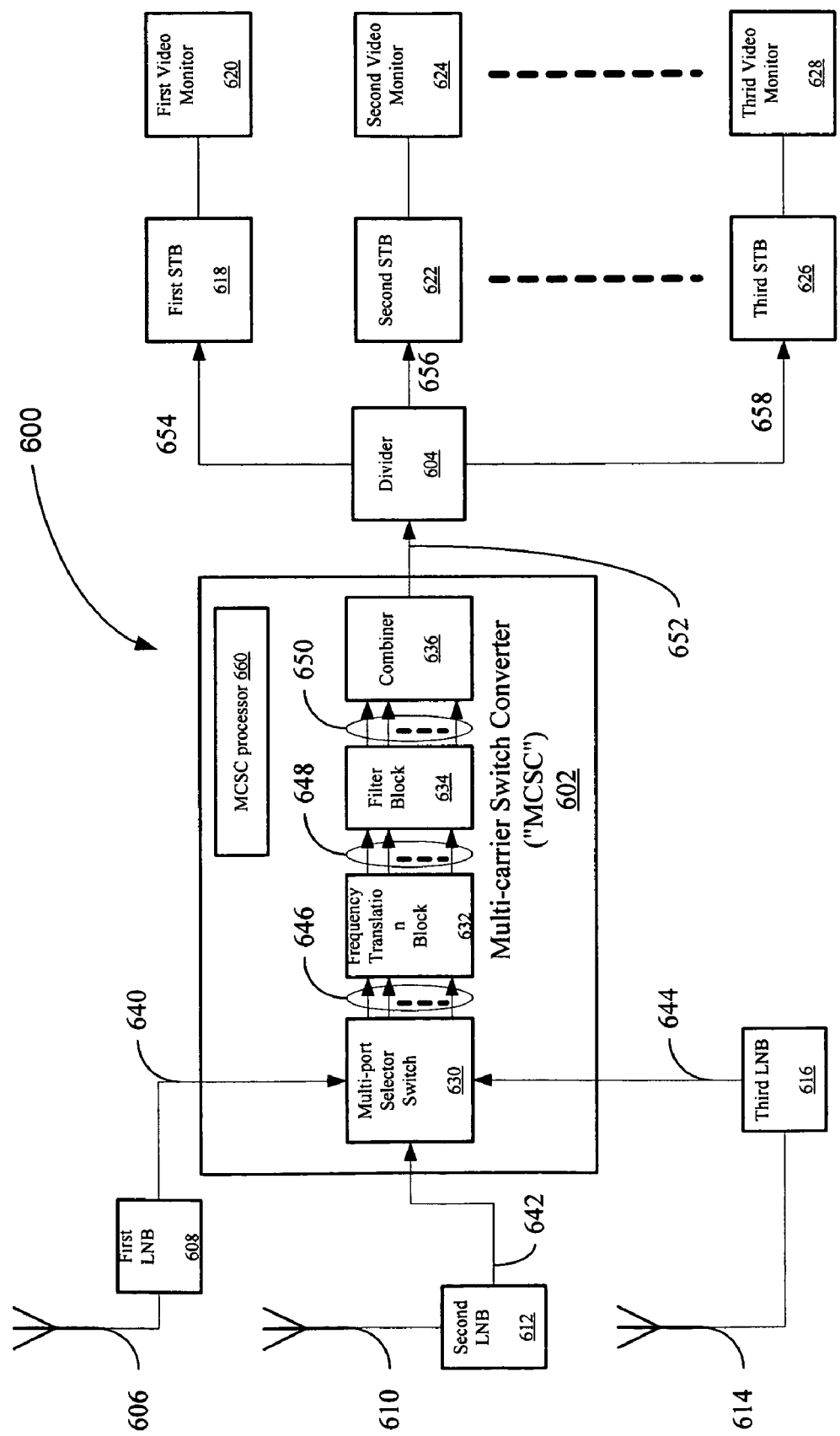
FIG. 6 is a block diagram of an example implementation of a DBS system including a Multi-Carrier Switch Converter ("MCSC") in signal communication with a plurality of set-top boxes ("STBs").

FIG. 6 describes the general system. FIG. 6 is a block diagram of an example implementation of a DBS system 600 including a MCSC 602 in signal communication with a combination of LNBs and satellite antennas and a plurality of STBs through a divider 604. As an example, FIG. 6 shows three combinations of satellite antennas and LNBs that include a first satellite antenna 606 and first LNB 608, second satellite antenna 610 and second LNB 612, and third satellite antenna 614 and third LNB 616. Additionally, FIG. 6 shows three sets of STBs and video monitors including a first STB 618 and first video monitor 620, second STB 622 and second 624, and third STB 626 and third video monitor 628. It is appreciated by those skilled in the art that while three combinations of satellite antennas and LNBs are shown, other numbers of combinations would be equally applicable without departing from the spirit of the invention. Similarly, while only three combinations of STBs and video monitors are shown, other numbers of combinations would be equally applicable without departing from the spirit of the invention. The MCSC 602 may include a Multi-port Selector Switch 630, a frequency translation block 632, a filter block 634 and a combiner 636.

As an example of operation, the MCSC 602 receives input signals 640, 642 and 644 from the first LNB 608, second LNB 612 and third LNB 616, respectively, and passes them to the Multi-port Selector Switch 630. The Multi-port Selector Switch 630 is a multi-input and multi-output switch that is capable of switching any of the inputs to any of the outputs. The MCSC 602 then passes the Multi-port Selector Switch output 646 to the frequency translation block 632 that translates any of the input frequencies from the Multi-port Selector Switch output 646 to a plurality of translated signals 648 that have a fixed carrier frequency with a corresponding bandwidth. The translated signals 648 are then passed to the combiner 636 through the filter block 634, which filters the translated signals 648 into a plurality of filtered translated signals 650. The combiner 636 then combines the filtered translated signals 650 into a single MCSC output signal 652 that is passed to the divider 604. The divider 604 may be a signal splitter that splits the MCSC output signal 652 into the signals (such as, for example, a first STB input signal 654, second STB input signal 656 and third STB input signal 658) that are feed into a plurality of STBs (such as, for example, the first STB 618, second STB 622 and third STB 626).

The MCSC 600 produces an MCSC output signal 652 that contains a number of transponder carriers that each STB is capable of independently tuning to. As a result, each STB receives a fixed carrier frequency signal containing all of its programming data. If an individual STB needs to switch to a new transponder, the STB instructs the MCSC 600 to switch the Multi-port Selector Switch 630 to a new position (if it is required) and set the translational frequency converter 632 to convert another input frequency 646 to the individual STB's corresponding carrier frequency. This communication may be accomplished by a MCSC processor 660 inside the MCSC 600 that communicates with a processor (not shown) in the STB through communication protocol between the STB and LNB. An example of the communication protocol may be the Digital Satellite Equipment Control System known as "DiSEqC™," which is a communication bus between satellite receivers and peripheral equipment using only an existing coaxial cable. In this example, the communication protocol would instruct the MCSC 600 to change its switch and change the band translation (i.e., the transponder translation).

It is appreciated by those skilled in the art that the Multi-port Selection Switch 630 may be implemented by combining a plurality of smaller multiport switches. For example, a 6×8 Multi-port Selection Switch 630 may be implemeted by combining four 6×2 switches. Additionally, each LNB output may be split and then applied to the Multi-port Selection Switch 630 and each LNB output signal may have a frequency range that may cover from 250 to 2,150 Mhz.

As a further example, the frequency translation block 632 may translate any of the frequencies between 925 to 2,175 MegaHertz ("MHz") on the Multi-port Selector Switch output 646 to a fixed carrier frequency signals 648 with a corresponding bandwidth. In this example, the frequency translation block 632 would take any of the satellite transponder signals (which are usually approximately 30 MHz wide) and translate them to fixed satellite transponder signals 648 that are then passed to the combiner 636 through the filter 634. The combiner then combines all the fixed satellite transponder signals 650 into one output signal 652 that is transmitted from the MCSC 602 to the divider 604.

Figure 7:
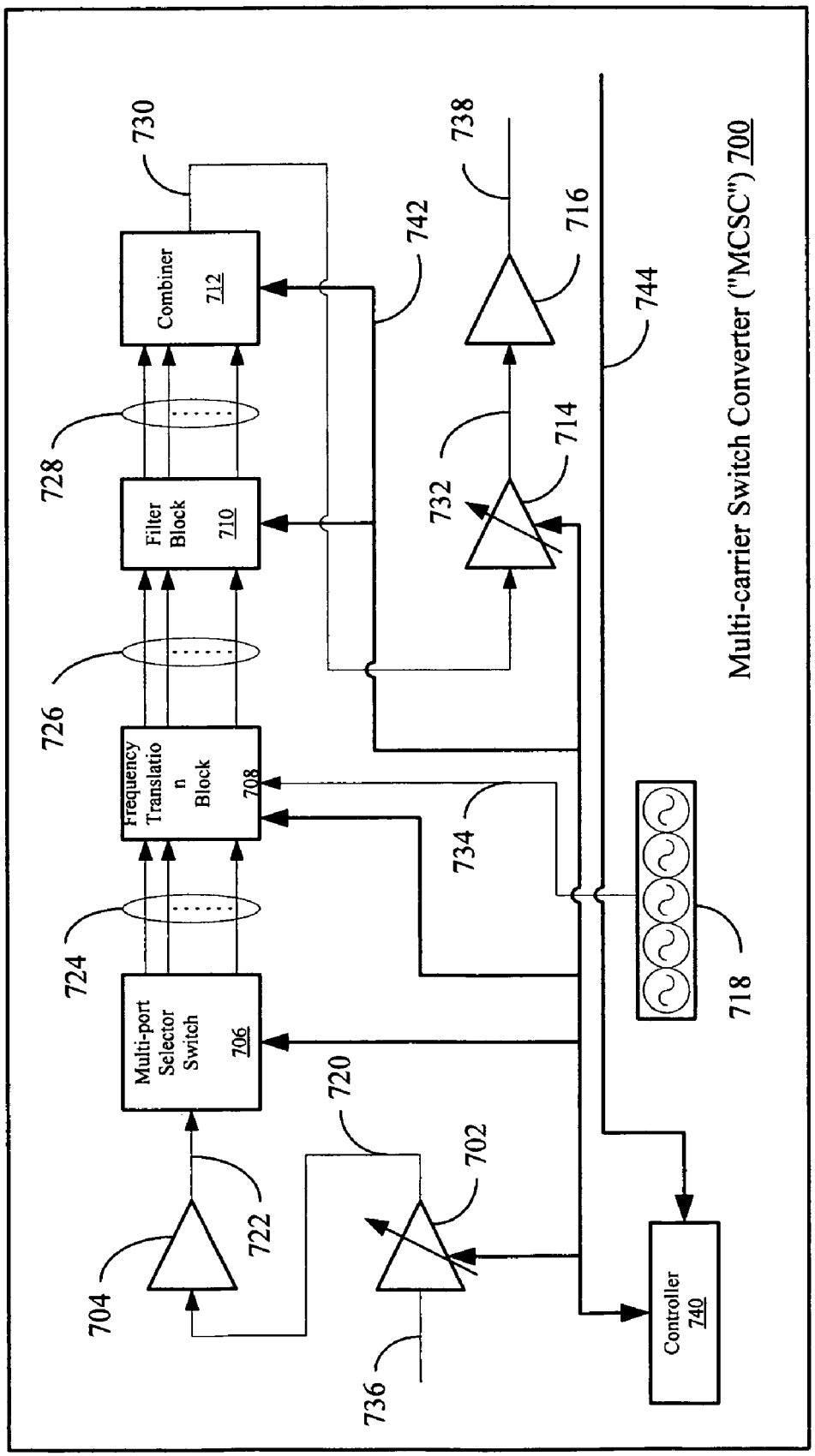
FIG. 7 is a high-level block diagram of an example implementation of the MCSC shown in FIG. 6.

FIG. 7 is a block diagram of an example implementation of the MCSC 700 shown in FIG. 6. In FIG. 7, the MCSC 700 may include an input AGC 702 (also known as an input block AGC), input amplifier 704, Multi-port Selector Switch 706, frequency translation block 708, filter block 710, combiner 712, output AGC 714 (also known as a combiner AGC), output amplifier 716, frequency source 718, and a controller 740. The input AGC 702 may be in signal communication with the Multi-port Selector Switch 706 via the input amplifier 704 and signal paths 720 and 722, and the Frequency translation Block 708 may be in signal communication with both the Multi-Selector Switch 706 and Filter Block 710 via signal paths 724 and 726, respectively. The Filter Block 710 may be in signal communication with the Combiner 712 via signal path 728 and the Combiner 712 may be in signal communication with the output amplifier 716 via the output AGC 714 and signal paths 730 and 732. Both the input amplifier 704 and output amplifier 716 are used to bring the signals to an approximate optimum level and may be incorporated into the AGC 714. The Frequency source 718 may be in signal communication with the frequency translation block 708 via signal path 734.

As an example of operation, the MCSC 700 receives satellite signals from the various LNBs (such as the first LNB 608, second LNB 612 and third LNB 616 shown in FIG. 6) via input signal path 736. These received satellite signals may be signals created by multiple input sources from multiple feed horns (i.e., LNBs) in one satellite antenna or possible multiple satellite antennas. The received satellite signals are then gain equalized with the input AGC 702 and amplified by input amplifier 704 (which may be incorporated into the AGC 702) before being passed to the Multi-port Selector Switch 706. The AGC 702 equalizes the levels of the inputs 736 to the Multi-port Selector Switch 706 so as to ease the isolation requirements on the Multi-port Selector Switch 706. The Multi-port Selector Switch 706 is typically a multi-input and multi-output switch that can switch any of the inputs to any of the outputs. The multiple outputs of the Multi-port Selector Switch 706 are passed to the Frequency Translation Block 708 via signal path 724. The number of outputs of the Multi-port Selector Switch 706 passed along signal path 724 may be either equal to or greater than the inputs from the LNBs. The outputs 724 of the Multi-port Selector Switch 706 are passed to the frequency translation block 708.

It is appreciated by those skilled in the art that the input block AGC 702 and combiner AGC 732 may be both implemented as either active circuits or passive circuits. In the example of an active circuit, the AGC circuits may be implemented utilizing amplifier circuits providing gain. In the example of a passive circuit, the AGC circuits may be implemented in a lossy form that may utilize, as an example, a PIN diode. In this example the lossy AGC may also be known as an automatic level control ("ALC") circuit.

The frequency translation block 708 is capable of translating any of the input signals 724 from their respective input frequencies to output signals with different carrier frequencies, which are passed, to the filter block 710 via signal path 726. As such, the frequency translation block 708 is capable of converting the input RF signals straight to the new RF output signals without going downconverter first to a baseband signal.

The frequency translation block 708 may include mixers and other components and may either do a conversion from the input signal carrier frequency to the individual output signal carrier frequencies or a step conversion from the input signal carrier frequency to baseband and then to the output signal carrier frequency. The frequency translation block 708 utilizes the frequency source 718, via signal path 734, as its frequency reference. As an example, the frequency translation block 708 may translate any of the input signal 724 frequencies between 925 to 2175 MHz coming out of the Multi-port Selector Switch 706 to a different output signal 726 having a fixed carrier frequency with a certain bandwidth. Typically the bandwidth depends on the data rate and may be from 1 MHz to 45 MH. In general, the frequency translation block 708 takes any of the transponder signals (which are input signals 722 approximately 30 MHz wide and were received by the different LNBs) and translates them to a different (potentially fixed) output transponder signal 726 that may be combined by the combiner 712.

The frequency source 718 may be implemented with a one or more frequency sources that include a number of phase-lock loops ("PLLs") and different voltage controlled oscillators ("VCO"). It is appreciated by those skilled in the art that the greater the number of VCOs the greater the frequency agility of the frequency source 718. Additionally, it is also appreciated that frequency source 718 may include a PLL with a single bank of VCOs, a PLL utilizing a signal VCO, and two PLLs each having banks of independent VCOs.

The filter block 710 is a block of filters such that each connected to each output signal passed from frequency translation block 708 via signal path 726. The filters in the filter block 710 may be either low-pass filters ("LPFs") or bandpass filters ("BPFs") depending on how the frequency translation block 708 is implemented. If the frequency translation block 708 is implemented with a heterodyne conversion approach, the filter block 710 will typically be implemented as BPFs. If instead, the frequency translation block 708 is implemented with the direct-conversion approach, the filter block 710 will typically be implemented by LPFs.

The combiner 712 may be any typical signal combiner capable of combining the input RF signals passed, on signal path 728, from the filter block 710 into a signal RF output signal passed on signal path 730. The combiner 712 may be implemented with either passive or active circuitry. In the example of the combiner 712 implemented utilizing active circuitry the combiner 712 may be considered a "smart combiner" because it may have active circuitry that helps improve the isolation between the input signals 728. As an example implementation, the combiner 712 may be implemented utilizing a Wilkinson combiner in combination with lumped elements and active circuitry capable of improving the isolation between the input signals 728. The combiner 712 may be capable of compensating for losses associated with a coaxial cable in each individual signal path 728 before feeding the combiner 712 output signal 730 to the AGC 714.

The output 730 of the combiner 712 is passed to the AGC 714. The AGC 714 compensates for losses associated with a coaxial cable along signal path 652, FIG. 6. Additionally, AGCs (not shown) may be included on signal path 728 to equalize the inputs in to the combiner 712. In this way the individual AGCs (not shown) may compensate for any difference in loss associated with transmitting the individual output signals 738 to the different STBs (such as first STB 618, second STB 622 and third STB 626).

The controller 740 is in signal communication with the input AGC 702, Multi-port Selection Switch 706, frequency translation block 708, combiner 712, output AGC 714 and frequency source 718 via signal path 742. Signal path 742 may be a control bus. Additionally, the controller 740 is in signal communication with the STBs (not shown) via signal path 744. Signal path 744 may also be a control bus such as, for example, a bus that operates utilizing DiSEqC™.

Figure 8:
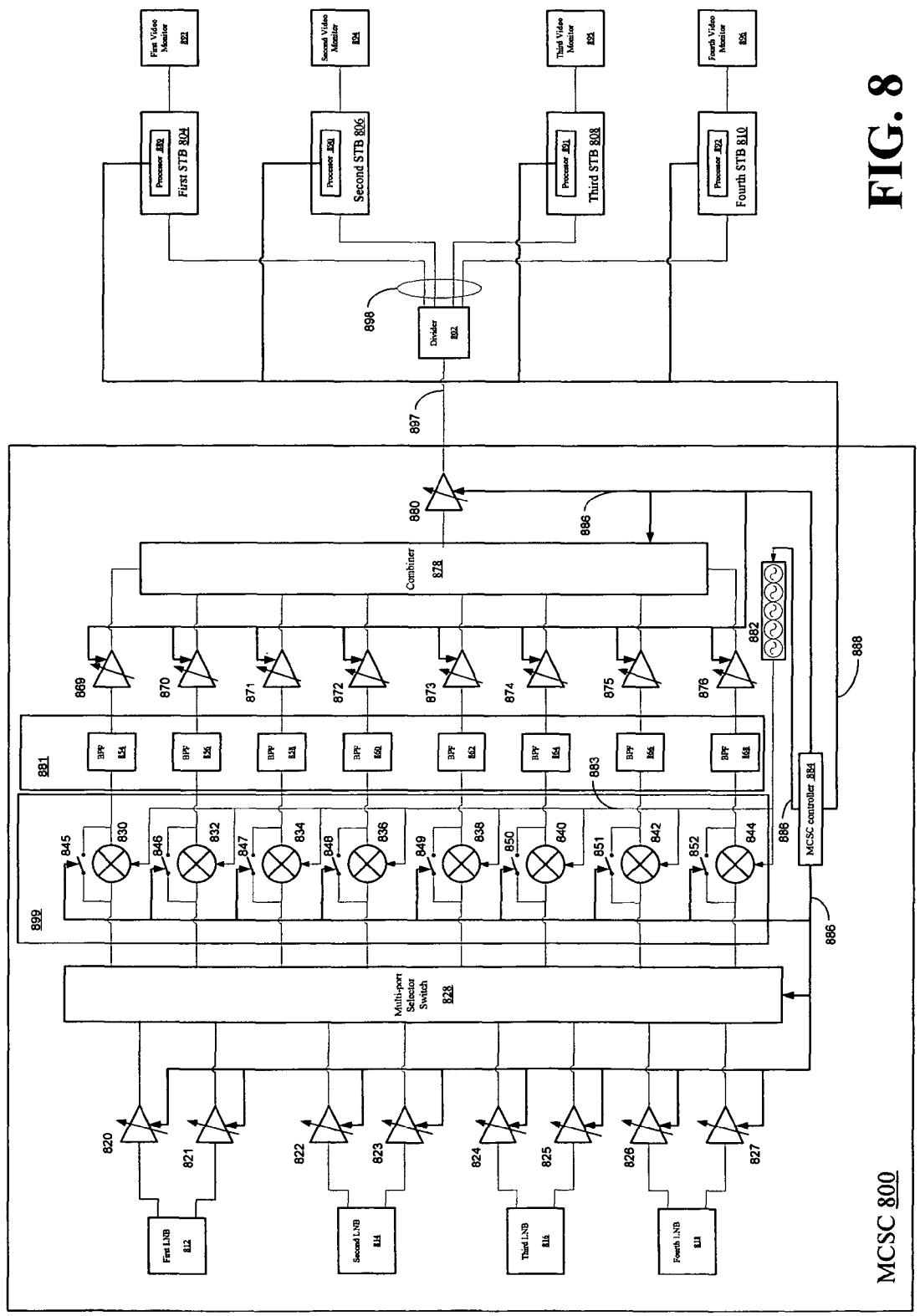
FIG. 8 is a block diagram of example implementation of the MCSC shown in FIG. 6 utilizing a heterodyne conversion process.

FIG. 8 is a block diagram of example implementation of the MCSC 800 shown in FIG. 6 utilizing the heterodyne conversion process. The MCSC 800 may be in signal communication with a divider 802, first STB 804, second STB 806, third STB 808, and fourth STB 810. The MCSC 800 may include a first LNB 812, second LNB 814, third LNB 816, fourth LNB 818, first input AGC 820, second input AGC 821, third input AGC 822, fourth input AGC 823, fifth input AGC 824, sixth input AGC 825, seventh input AGC 826, eighth input AGC 827, multi-port selector switch 828, first mixer 830, second mixer 832, third mixer 834, fourth mixer 836, fifth mixer 838, sixth mixer 840, seventh mixer 842, eighth mixer 844, first switch 845, second switch 846, third switch 847, fourth switch 848, fifth switch 849, sixth switch 850, seventh switch 851, eighth switch 852, first BPF 854, second BPF 856, third BPF 858, fourth BPF 860, fifth BPF 862, sixth BPF 864, seventh BPF 866, eighth BPF 868, first output AGC 869, second output AGC 870, third output AGC 871, fourth output AGC 872, fifth output AGC 873, sixth output AGC 874, seventh output AGC 875, eighth output AGC 876, combiner 878, combiner output AGC 880, frequency source 882, and MSCS controller 884.

It is again appreciated by those skilled in the art that the input block AGC circuits may be implemented as either active circuits or passive circuits. In the example of an active circuit, the AGC circuits may be implemented utilizing amplifier circuits providing gain. In the example of a passive circuit, the AGC circuits may be implemented in a lossy form that may utilize, as an example, a PIN diode. In this example the lossy AGC may also be known as an automatic level control ("ALC") circuit.

In operation, the MSCS 800 receives satellite transponder signals via one or more satellite antennas which are processed by the first LNB 812, second LNB 814, third LNB 816, and fourth LNB 818 and feed into the first input AGC 820, second input AGC 821, third input AGC 822, fourth input AGC 823, fifth input AGC 824, sixth input AGC 825, seventh input AGC 826, and eighth input AGC 827, respectively. The input AGCs equalize the transponder signal levels from the LNBs to the improve insertion loss and isolation between the transponder signals input into the Multi-port Selector Switch 828. The AGCs are going to take the transponder signals coming in from the LNBs and if one of them is too large in magnitude, the corresponding AGC will reduce the magnitude of the signal to a magnitude level that will not cause the switch to leak one input transponder signal into the output path of another transponder signal. The Multi-port Selector Switch 828 is typically a multi-input and multi-output switch that can switch any of the inputs to any of the outputs. In general, the Multi-port Selector Switch 828 is an active switch that is capable of connecting to one or more input ports to several output ports. The multiple outputs of the Multi-port Selector Switch 828 are passed to a Frequency Translation Block 899.

The Frequency Translation Block 899 includes the first mixer 830, second mixer 832, third mixer 834, fourth mixer 836, fifth mixer 838, sixth mixer 840, seventh mixer 842, eighth mixer 844, first switch 845, second switch 846, third switch 847, fourth switch 848, fifth switch 849, sixth switch 850, seventh switch 851, the eighth switch 852. The frequency translation block 899 is capable of translating any of the input transponder signals from their respective input frequencies to output signals with different carrier frequencies which are passed to the filter block 881 which includes first BPF 854, second BPF 856, third BPF 858, fourth BPF 860, fifth BPF 862, sixth BPF 864, seventh BPF 866, eighth BPF 868. The BPFs may be implemented utilizing surface acoustic wave ("SAW") filters. The switches bypass the mixer if the input frequency is equal to the output frequency, which may occasionally happens.

The frequency translation block 899 mixers do a direct conversion from the input signal carrier frequency to the individual output signal carrier frequencies. The frequency translation block 899 utilizes the frequency source 882, via signal path 883, as its frequency reference. As an example, the frequency translation block 899 may translate any of the input transponder signal frequencies between 925 to 2,175 MHz coming out of the Multi-port Selector Switch 706 to a different output signal having a fixed carrier frequency with a certain bandwidth. In general, the frequency translation block 899 takes any of the transponder signals (which are input signals which are approximately 30 MHz wide and were received by the different LNBs) and translates them to a different (potentially fixed) output transponder signal that may be combined by the combiner 878. The BPFs remove both the unwanted low-end and high-end mixer products for the mixers and pass the filtered transponder signals to the combiner 878 through the first output AGC 869, second output AGC 870, third output AGC 871, fourth output AGC 872, fifth output AGC 873, sixth output AGC 874, seventh output AGC 875, eighth output AGC 876. The output AGCs equalize the inputs into the combiner 878 with each individual AGC compensating for any differences in loss associated with transmitting the individual output signals to the different STBs (such as first STB 804, second STB 806, third STB 808, and fourth STB 810).

The frequency source 882 may be implemented with a one or more frequency sources that include a number of phase-lock loops ("PLLs") and different voltage controlled oscillators ("VCO"). It is appreciated by those skilled in the art that the greater the number of VCOs the greater the frequency agility of the frequency source 882. Additionally, it is also appreciated that frequency source 882 may include implements that have a PLL with a single bank of VCOs or a PLL utilizing a single VCO.

The combiner 878 may be any typical signal combiner capable of combining the plurality of input RF signals passed from the filter block 881 into a signal RF output signal passed on signal path 897. The combiner 878 may be implemented with either passive or active circuitry. In the example of the combiner 878 implemented utilizing active circuitry the combiner 878 may be considered a "smart combiner" because it may have active circuitry that helps improve the isolation between the input signals from the filter block 881. As an example implementation, the combiner 878 may be implemented utilizing a Wilkinson combiner in combination with lumped elements and active circuitry cable of improving the isolation between the input signals. The combiner 878 may be capable of compensating for losses associated with a coaxial cable in each individual input signal before feeding the combiner 878 output signal to the combiner AGC 880. The output of the combiner 878 is passed to the combiner AGC 880. The combiner AGC 880 compensates for losses associated with a coaxial cable along signal path 897.

Once processed by the MCSC 800, a simple divider 802 connected to the output signal path 897 (through a coaxial cable) splits the signals transmitted from the MCSC 800 throughout the household. The different STBs (such as first STB 804, second STB 806, third STB 808, and fourth STB 810) are then connected to the separate split signal paths. Each individual STB is capable of tuning into a specific frequency band that contains all the programming information from all the satellite transponders. Once tuned, each STB sends the decoded video information to its corresponding video monitor (such as first video monitor 893, second video monitor 894, third video monitor 895, and fourth video monitor 896).

The MCSC controller 884 is in signal communication with the input AGCs, Multi-port Selection Switch 828, the switches in frequency translation block 899, output AGCs, combiner 878, combiner AGC 880 and frequency source 882 via signal path 886. Signal path 886 may be a control bus. Additionally, the MCSC controller 884 may be in signal communication with controllers in the individual STBs (such as first processor 889, second processor 890, third processor 891 and fourth processor 892) via signal path 888. Signal path 888 may also be a control bus such as, for example, a bus that operates utilizing DiSEqC™.

The individual STB processors 889, 890, 891 and 892 utilize the signal path 888 to communicate with MCSC controller 884 in order to request switching between transponder signals.

Figure 9:
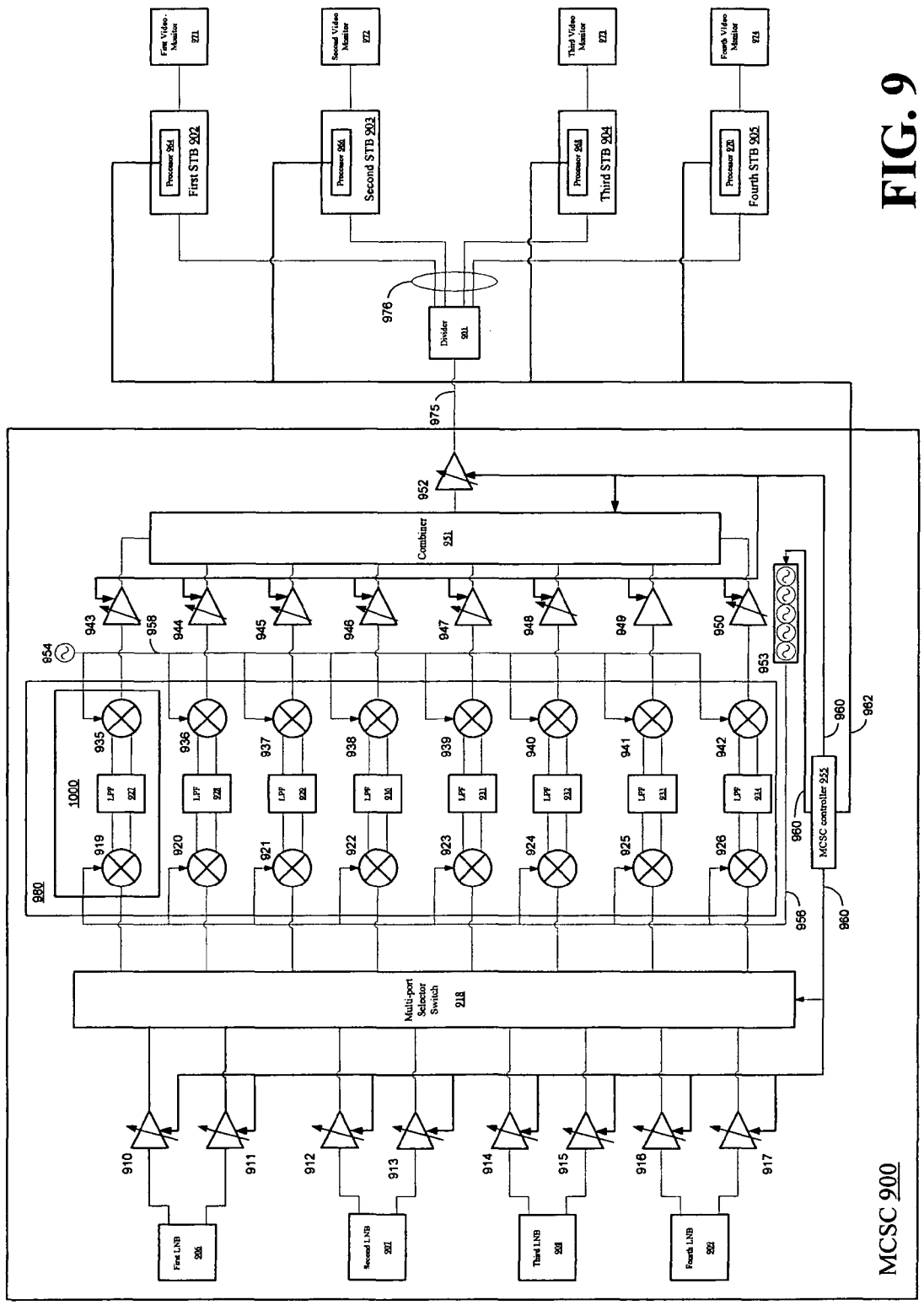
FIG. 9 is a block diagram of example implementation of the MCSC shown in FIG. 6 utilizing a direct conversion process to convert the input signal to baseband and then up to a new carrier.

FIG. 9 is a block diagram of another example implementation of the MCSC 900 shown in FIG. 6 utilizing a direct conversion down to baseband and direct up conversion process. The MCSC 900 may be in signal communication a divider 901, first STB 902, second STB 903, third STB 904, and fourth STB 905. The MCSC 900 may include a first LNB 906, second LNB 907, third LNB 908, fourth LNB 909, first input AGC 910, second input AGC 911, third input AGC 912, fourth input AGC 913, fifth input AGC 914, sixth input AGC 915, seventh input AGC 916, eighth input AGC 917, multi-port selector switch 918, first downconverter mixer 919, second downconverter mixer 920, third downconverter mixer 921, fourth downconverter mixer 922, fifth downconverter mixer 923, sixth downconverter mixer 924, seventh downconverter mixer 925, eighth downconverter mixer 926, first LPF 927, second LPF 928, third LPF 929, fourth LPF 930, fifth LPF 931, sixth LPF 932, seventh LPF 933, eighth LPF 934, first upconverter mixer 935, second upconverter mixer 936, third upconverter mixer 937, fourth upconverter mixer 938, fifth upconverter mixer 939, sixth upconverter mixer 940, seventh upconverter mixer 941, eighth upconverter mixer 942, first output AGC 943, second output AGC 944, third output AGC 945, fourth output AGC 946, fifth output AGC 947, sixth output AGC 948, seventh output AGC 949, eighth output AGC 950, combiner 951, combiner output AGC 952, first frequency source 953, second frequency source 954, and MSCS controller 955.

In operation, the MSCS 900 receives satellite transponder signals via one or more satellite antennas which are processed by the first LNB 906, second LNB 907, third LNB 908, and fourth LNB 909 and fed into the first input AGC 910 and second input AGC 911, third input AGC 912 and fourth input AGC 913, fifth input AGC 914 and sixth input AGC 915, and seventh input AGC 916 and eighth input AGC 917, respectively. The input AGCs equalize the transponder signal levels from the LNBs to the improve insertion loss and isolation between the transponder signals input into the Multi-port Selector Switch 918. The AGCs are going to take the transponder signals coming in from the LNBs and if one of them is too large in magnitude, the corresponding AGC will reduce the magnitude of the signal to a magnitude level that will not cause the switch to leak one input transponder signal into the output path of another transponder signal. The Multi-port Selector Switch 918 is typically a multi-input and multi-output switch that can switch any of the inputs to any of the outputs. The multiple outputs of the Multi-port Selector Switch 918 are passed to a Frequency Translation Block 980.

The Frequency Translation Block 980 includes the first downconverter mixer 919, second downconverter mixer 920, third downconverter mixer 921, fourth downconverter mixer 922, fifth downconverter mixer 923, sixth downconverter mixer 924, seventh downconverter mixer 925, eighth downconverter mixer 926, first LPF 927, second LPF 928, third LPF 929, fourth LPF 930, fifth LPF 931, sixth LPF 932, seventh LPF 933, eighth LPF 934, first upconverter mixer 935, second upconverter mixer 936, third upconverter mixer 937, fourth upconverter mixer 938, fifth upconverter mixer 939, sixth upconverter mixer 940, seventh upconverter mixer 941, and eighth upconverter mixer 942. The frequency translation block 980 is capable of translating any of the input transponder signals from their respective input frequencies to output signals with different carrier frequencies by direct down conversion, low-pass filtering and direct up conversion.

The frequency translation block 980 downconverter mixers do a direct conversion from the input signal carrier frequency to a baseband signal that is low-pass filtered and the direct conversion mixed up, with upconverter mixers, to the individual output signal carrier frequencies. The frequency translation block 980 utilizes both the first frequency source 953, via signal path 956, and second frequency source 954, via signal path 958, as its frequency references. As an example, the frequency translation block 980 may translate any of the input transponder signal frequencies between 925 to 2,175 MHz coming out of the Multi-port Selector Switch 918 to a different output signal having a fixed carrier frequency with a certain bandwidth. In general, the frequency translation block 980 takes any of the transponder signals (which are input signals which are approximately 30 MHz wide and were received by the different LNBs) and translates them to a different (potentially fixed) output transponder signal that may be combined by the combiner 951. The LPFs remove the unwanted low-end mixer products for the downconverter mixers and pass the filtered transponder signals to the upconverter mixers. The upconverter mixers than pass the upconverter new transponder signals to the combiner 951 through the first output AGC 943, second output AGC 944, third output AGC 945, fourth output AGC 946, fifth output AGC 947, sixth output AGC 948, seventh output AGC 949, and eighth output AGC 950. The output AGCs equalize the inputs into the combiner 951 with each individual AGC compensating for any differences in loss associated with transmitting the individual output signals to the different STBs (such as first STB 902, second STB 903, third STB 904, and fourth STB 905).

The first frequency source 953 may be implemented with a one or more frequency sources that include a number of phase-lock loops ("PLLs") and different voltage controlled oscillators ("VCO"). It is appreciated by those skilled in the art that the greater the number of VCOs the greater the frequency agility of the frequency source 953. Additionally, it is also appreciated that frequency source 953 may include implementations that have a PLL with a single bank of VCOs or a PLL utilizing a single VCO in combination.

Similarly, the second frequency source 954 may be implemented with one or more frequency sources that include a number of phase-lock loops ("PLLs") and different voltage controlled oscillators ("VCO"). It is appreciated by those skilled in the art that the greater the number of VCOs the greater the frequency agility of the frequency source 954. Additionally, it is also appreciated that frequency source 954 may include implementations that have a PLL with a single bank of VCOs or a PLL utilizing a single VCO in combination. It is appreciated, that in this example implementation the first frequency source 953 may be fully agile while the second frequency source 954 may be either fully agile or fixed.

The combiner 951 may be any typical signal combiner capable of combining the plurality of input RF signals passed from the AGCs into a single RF output signal passed on signal path 975. The combiner 951 may be implemented with either passive or active circuitry. In the example of the combiner 951 implemented utilizing active circuitry the combiner 951 may be considered a "smart combiner" because it may have active circuitry that helps improve the isolation between the input signals from the AGCs. As an example implementation, the combiner 951 may be implemented utilizing a Wilkinson combiner in combination with lumped elements and active circuitry capable of improving the isolation between the input signals. The combiner 951 may be capable of compensating for losses associated with a coaxial cable in each individual input signal before feeding the combiner 951 output signal to the combiner AGC 952. The output of the combiner 951 is passed to the combiner AGC 952. The combiner AGC 952 compensates for losses associated with a coaxial cable along signal path 975.

Once processed by the MCSC 900, a simple divider 901 connected to the output signal path 975 splits the signals transmitted from the MCSC 900 throughout the household. The different STBs (such as first STB 902, second STB 903, third STB 904, and fourth STB 905) are then connected to the separate split signal paths. Each individual STB is capable of tuning into a specific frequency band that contains all the programming information from all the satellite transponders. Once tuned, each STB sends the decoded video information to its corresponding video monitor (such as first video monitor 971, second video monitor 972, third video monitor 973, and fourth video monitor 974).

The MCSC controller 955 is in signal communication with the input AGCs, Multi-port Selection Switch 918, output AGCs, combiner 951, combiner AGC 952 and first frequency source 953 (and optionally second frequency source 954) via signal path 960. Signal path 960 may be a control bus. Additionally, the controller 955 may be in signal communication with a plurality of controllers in the individual STBs (such as first processor 964, second processor 966, third processor 968 and fourth processor 970) via signal path 962. Signal path 962 may also be a control bus such as, for example, a bus that operates utilizing DiSEqC™.

The individual STB processors 964, 966, 968 and 970 utilize the signal path 962 to communicate with MCSC controller 955 in order to request switching between transponder signals.

Figure 10:
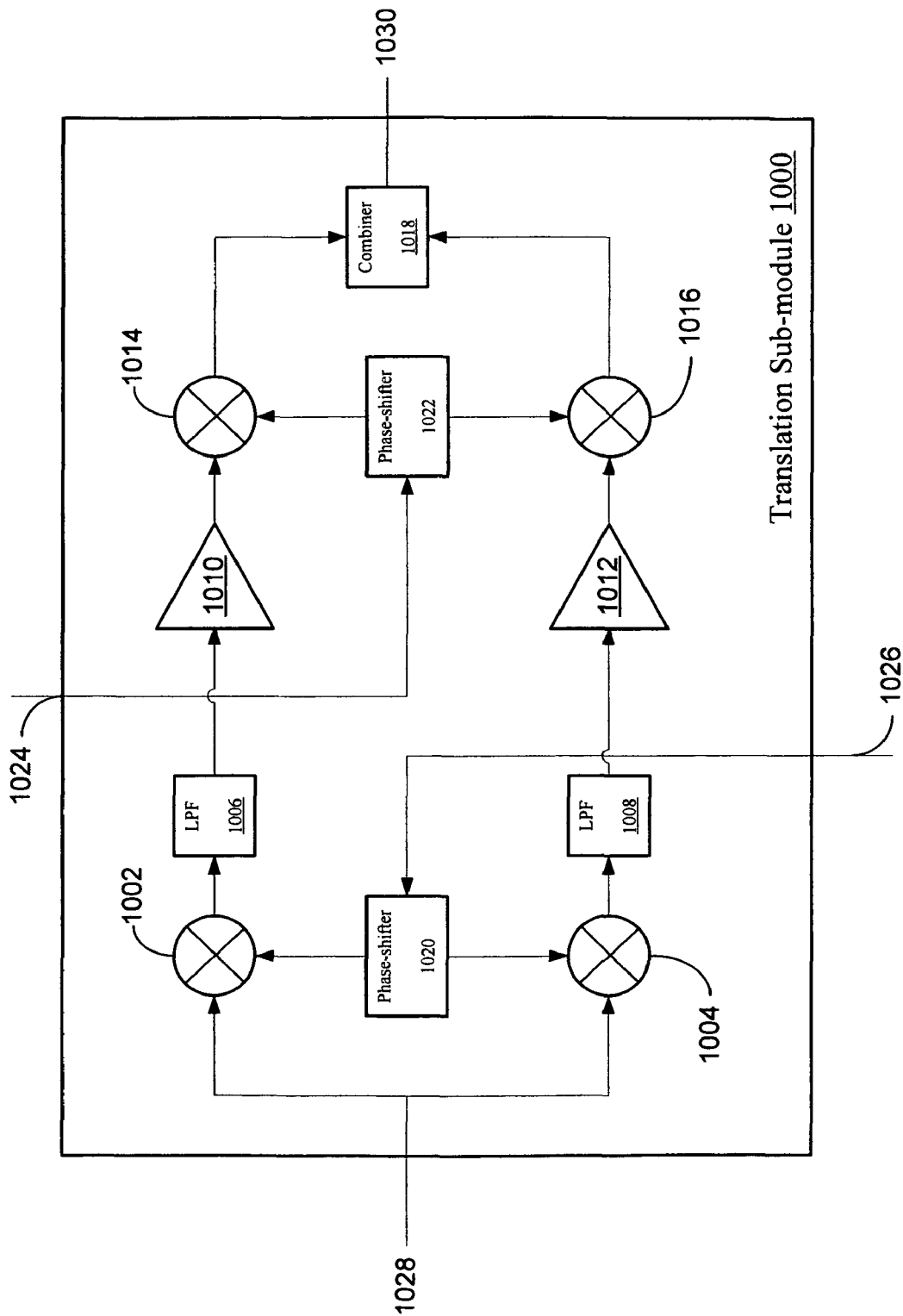
FIG. 10 is a block diagram of an example implementation of an individual demodulator and modulator module shown in FIG. 9.

FIG. 10 is a block diagram of an example implementation of an individual demodulator and modulator translation sub-module 1000 within the frequency translation block 980 shown in FIG. 9. The translation sub-module 1000 is capable of performing a direct down-conversion and direct up-conversion process. The translation sub-module 1000 may include an in-phase ("I") downconverter mixer 1002, quadrature-phase ("Q") downconverter mixer 1004, I LPF 1006, Q LPF 1008, I amplifier 1010, Q amplifier 1012, I upconverter mixer 1014, Q upconverter mixer 1016, combiner 1018, downconverter phase-shifter 1020 and upconverter phase-shifter 1022.

In operation, the specific RF transponder signal is output by the Multi-port Selector Switch 918 and is input into the translational sub-module 1000 via signal path 1028. The RF transponder signal 1028 is mixed in both the I demodulator mixer 1002, Q demodulator mixer 1004 with the first frequency source 953, which is fed into both mixers in quadrature via 90 phase-shifter 1020.

The I demodulator mixer 1002 and Q demodulator mixer 1004 mix the RF transponder signal 1028 down to baseband I and Q signals that have some unwanted harmonics. The I LPF 1006 and Q LPF 1008 remove the unwanted harmonics from the I and Q baseband signals and pass them to the I and Q amplifiers 1010 and 1012 which adjust magnitude levels of the I and Q baseband signals before injecting them into the I and Q modulator mixers 1014 and 1016. The I and Q modulator mixers 1014 and 1016 modulate the I and Q baseband signals with the second frequency source 954, which is fed into both mixers in quadrature via 90 phase-shifter 1022. The result from the I and Q modulator mixers 1014 and 1016 are then passed to the quadrature combiner 1018 which combines the I and Q modulated signals into a combined signal that is passed via signal path 1030 to the respective output AGCs that include first output AGC 943, second output AGC 944, third output AGC 945, fourth output AGC 946, fifth output AGC 947, sixth output AGC 948, seventh output AGC 949, and eighth output AGC 950.

Figure 11:
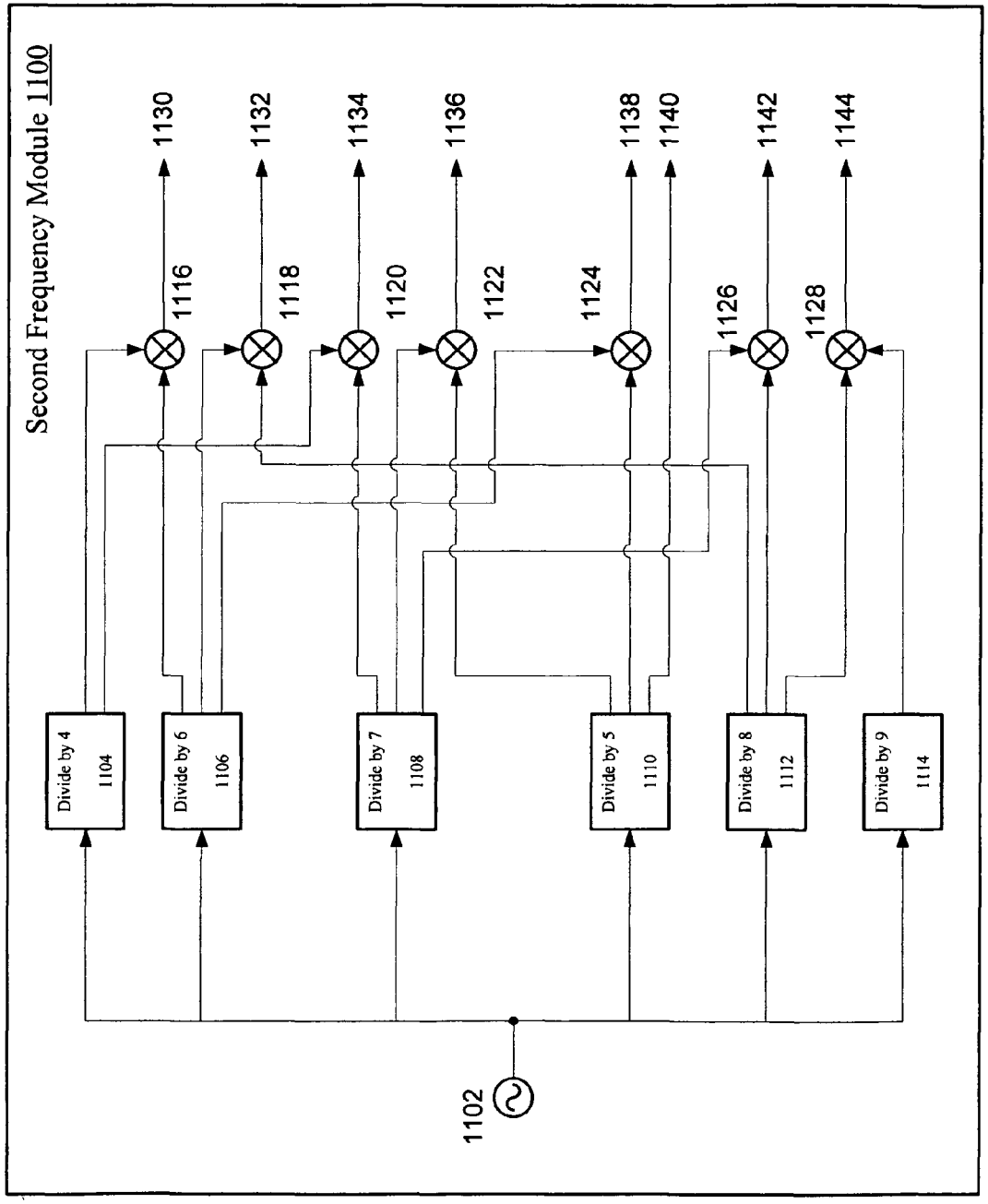
FIG. 11 is a block diagram of an example implementation of second frequency source module shown in FIG. 9 where the second frequency source is a fixed frequency source.
Figure 12:
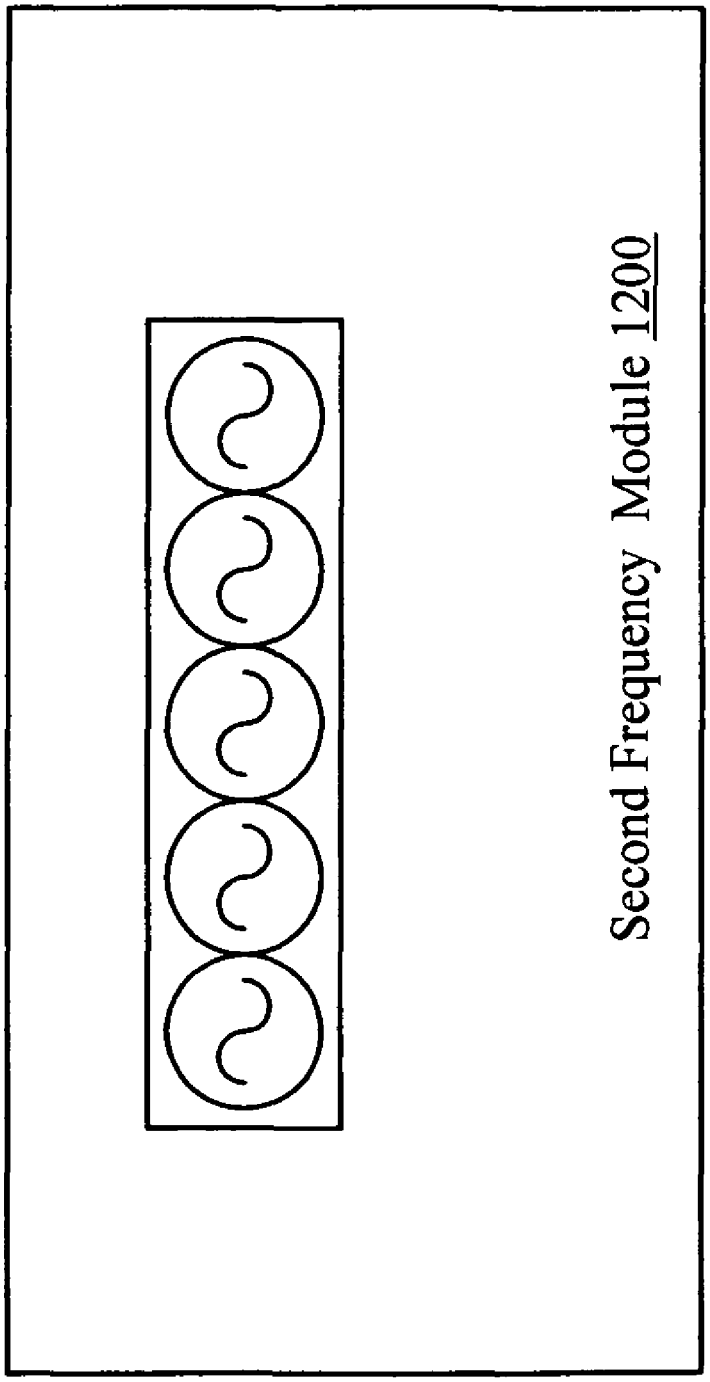
FIG. 12 is a block diagram of an example implementation of a second frequency source module shown in FIG. 9 where the second frequency source is a fully agile frequency source.

FIG. 11 is a block diagram of an example implementation of second frequency source module 1100 shown in FIG. 9 where the second frequency source is a fixed frequency source. In this example implementation, the second frequency source 1100 may include a VCO 1102, divide by four module 1104, divide by six module 1106, divide by seven module 1108, divide by five module 1110, divide by eight module 1112, divide by nine module 1114, first product module 1116, second product module 1118, third product module 1120, fourth product module 1122, fifth product module 1124, sixth product module 1126, and seventh product module 1128. In this example, if the VCO 1102 is set to approximately 5,040 MHz, then the output 1130 would be 2,100 MHz, output 1132 would be 1,470 MHz, output 1134 would be 1,980 MHz, output 1136 would be 1,728 MHz, output 1138 would be 1,848 MHz, output 1140 would be 1,008 MHz, output 1142 would be 1,350 MHz, and output 1144 would be 1,900 MHz. Alternatively, the second frequency source may be non-fixed and fully agile. FIG. 12 is a block diagram of an example implementation of a second frequency source module 1200 shown in FIG. 9 where the second frequency source is a fully agile frequency source.

Figure 13:
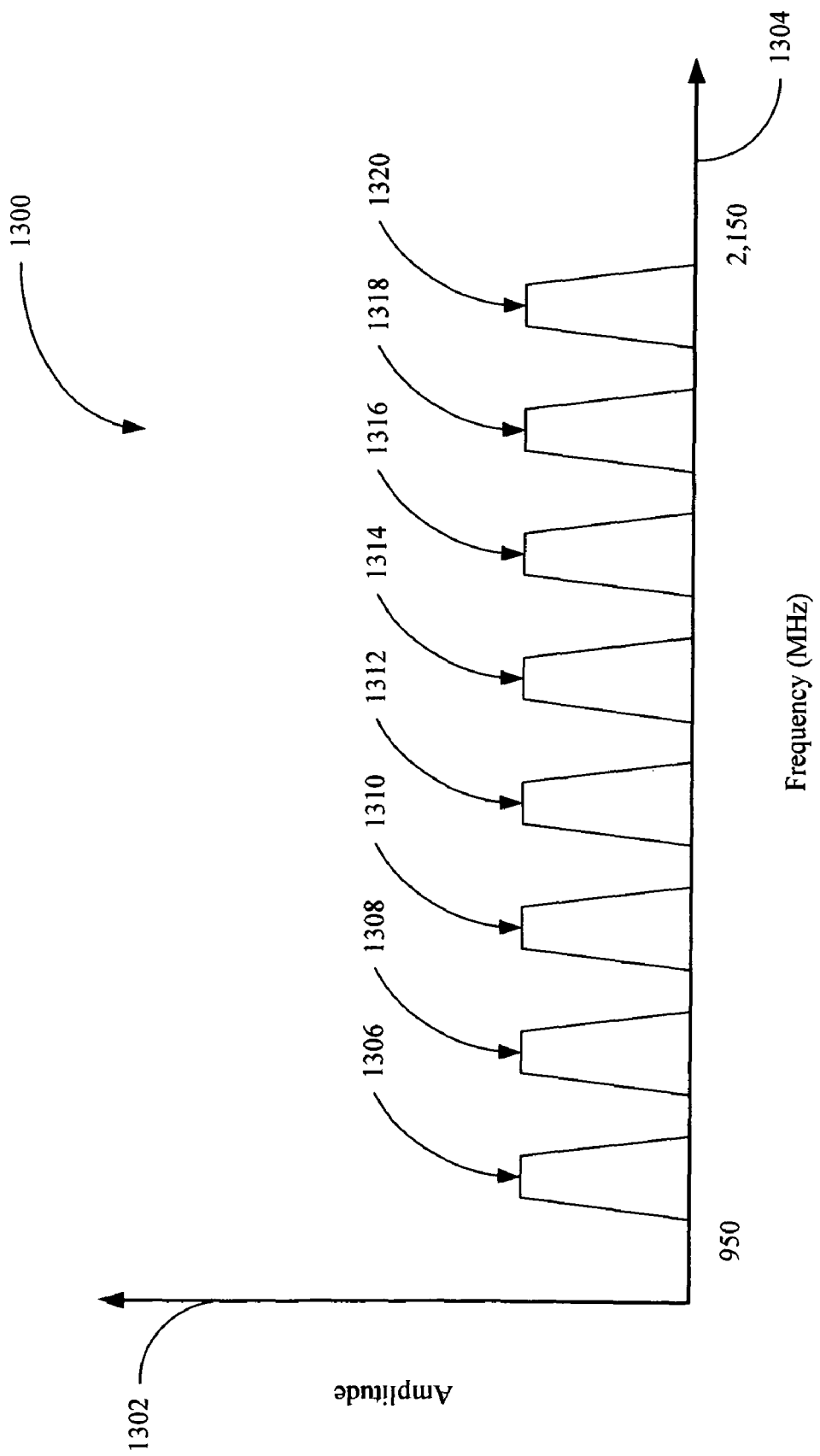
FIG. 13 is a plot showing a graphical representation of an example frequency plan utilized by the MCSC shown in FIG. 8 and FIG. 9.

FIG. 13 is a plot 1300 showing a graphical representation of an example frequency plan between 950 to 2,150 MHz utilized by the MCSC shown in both FIG. 8 and FIG. 9. The plot 1300 shows the frequency plan in amplitude 1302 versus frequency 1304 in MHz. Both example implementations of the MCSC in FIG. 8 and FIG. 9 utilize eight individual branches (even though only four STBs have been shown as examples) of signals that are combined by the combiners. As such the maximum resulting frequency plan would include eight distinct frequency bands of information 1306, 1308, 1310, 1312, 1314, 1316, 1318 and 1320, which up to eight individual STBs could potentially tune into individually. In this example, up to eight individual STB could be programmed each to only tune into information carried in one of the eight bands of information. In this way, each individual STB could independently and simultaneously tuning into either the same or different transmitted transponder channels.

Figure 14:
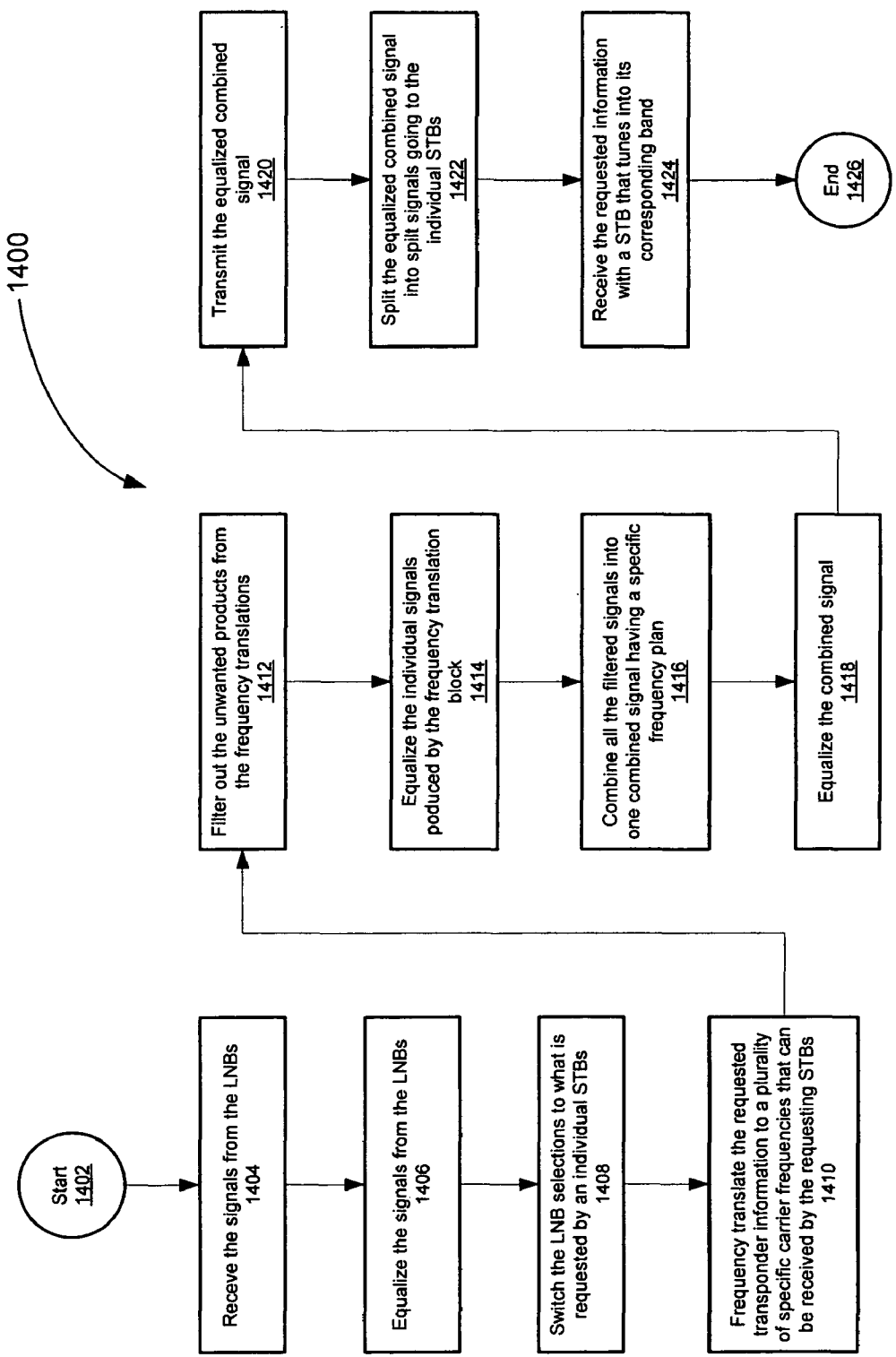
FIG. 14 is a flow-chart diagram showing the process preformed by the MCSC shown in FIG. 8.

FIG. 14 is a flow-chart diagram 1400 showing the process preformed by the MCSC shown in FIG. 8. The process starts in step 1402. In step 1404, the MCSC receives the signals from the LNBs and in step 1406 the input AGCs equalize the signals from the LNBs and send the equalized signals to the Multi-port selection switch. The Multi-port selection switch switches the LNB selections to what is requested by any individual STB in step 1408 and in step 1410 the frequency translation block performs a direct conversion on the received transponder information to a plurality of specific carrier frequencies that can be received by the individual STBs. The filter block then performs a bandpass filter step, in step 1412, that filters out the unwanted products from the direct conversion frequency translations.

The output AGCs then equalize the individual signals produced by the frequency translation block in step 1414 and in step 1416 the combiner combines all the filtered signals into one combined signal having a specific frequency plan. The combiner AGC then equalizes the combined signal in step 1418 and then transmits the equalized combined signal down a signal coaxial cable in step 1420.

The equalized combined signal is then split by a splitter, in step 1422, and the split signals are transmitted to the individual STBs throughout the household. The STB then receives the requested information on the split signal in step 1424 and the process then ends in step 1426.

Figure 15:
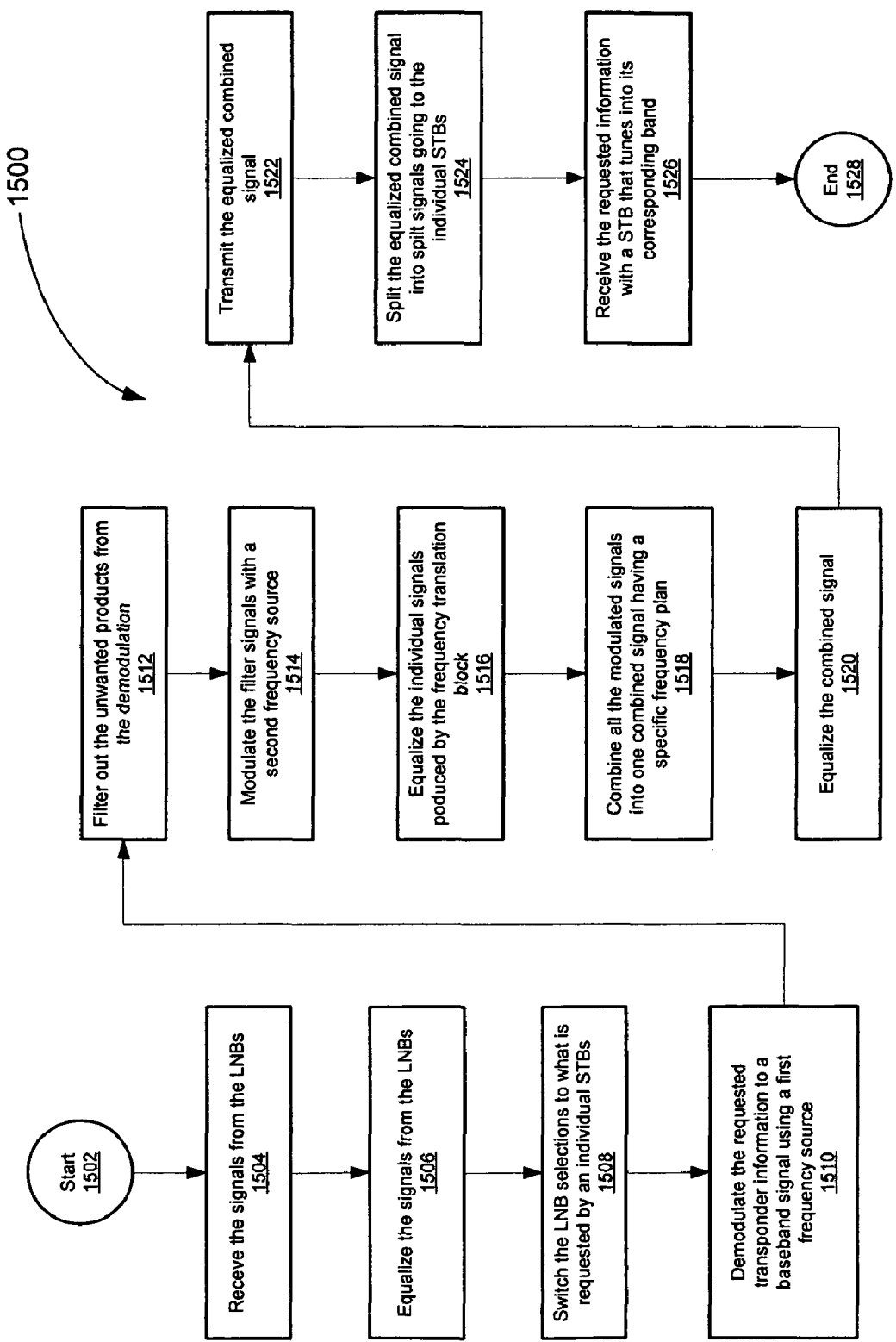
FIG. 15 is a flow-chart diagram showing the process preformed by the MCSC shown in FIG. 9.

FIG. 15 is a flow-chart diagram showing the process preformed by the MCSC shown in FIG. 9. The process starts in step 1502. In step 1504, the MCSC receives the signals from the LNBs and in step 1506 the input AGCs equalize the signals from the LNBs and send the equalized signals to the Multi-port selection switch. The Multi-port selection switch switches the LNB selections to what is requested by any individual STB in step 1508 and in step 1510 the frequency translation block performs a direct conversion on the received transponder information signals by demodulating, with a first frequency source, the received transponder signals into a plurality of baseband signals. The baseband signals are then low-pass filtered, in step 1512, where the unwanted harmonics from the demodulation are removed. The filtered signals are then modulated back to an RF frequency in step 1514 utilizing a second frequency source.

The output AGCs then equalize the individual signals produced by the frequency translation block in step 1516 and in step 1518 the combiner combines all the filtered signals into one combined signal having a specific frequency plan. The combiner AGC then equalizes the combined signal in step 1520 and then transmits the equalized combined signal down a signal coaxial cable in step 1522.

The equalized combined signal is then split by a splitter, in step 1524, and the split signals are transmitted to the individual STBs throughout the household. The STB then receives the requested information on the split signal in step 1526 and the process then ends in step 1528.

The processes described in FIG. 14 and FIG. 15 may be performed by hardware or software. If the process is performed by software, the software may reside in software memory (not shown) in a controller 740 in the MCSC 700 and/or a removable memory medium. The software in memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, i.e., "a non-exhaustive list" of the computer-readable medium, would include the following: an electrical connection ("electronic") having one or more wires, a portable computer diskette ("magnetic"), a RAM (electronic), a read-only memory ("ROM") (electronic), an erasable programmable read-only memory ("EPROM" or Flash memory) (electronic), an optical fiber (optical), and a portable compact disc read-only memory ("CDROM") (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A Multi-carrier Switch Converter ("MCSC") for multiplexing a plurality of input signals received at the MCSC into a single MCSC output signal, the MCSC comprising:
   a Multi-port Selector Switch, wherein the Multi-port Selector Switch receives the plurality of input signals and produces a Multi-port Selector Switch output, wherein the Multiport Selector Switch output includes a plurality of switched output signals;
   a frequency translation block in signal communication with the Multi-port Selector Switch, wherein the frequency translation block receives the Multi-port Selector Switch output and frequency translates each switched output signal of the plurality of switched output signals to a plurality of translated signals, wherein each translated signal has a fixed carrier frequency that is associated with a predetermined one of a plurality of set top boxes (STBs); and
   a combiner in signal communication with frequency translation block, wherein the combiner receives the plurality of frequency translated signals and combines them to produce the single MCSC signal.

2. The MCSC of claim 1, further including a filter block in signal communication with the frequency translation block and the combiner, wherein the filter block includes a plurality of filters and each filter, of the plurality of filters, filters each frequency translated signal of the plurality of frequency translated signals to produce a plurality of filtered translated signals.

3. The MCSC of claim 2, wherein each filter of the plurality of filters is a low-pass filter.

4. The MCSC of claim 2, wherein each filter of the plurality of filters is a high-pass filter.

5. The MCSC of claim 2, wherein each filter of the plurality of filters is a band-pass filter.

6. The MCSC of claim 1, wherein
   the Multi-port Selector Switch is configured, responsive to input selections received from the STBs, to output a single switched output signal to each set top box (STB), and
   the frequency translation block frequency translates, for each STB, the single switched output signal to a translated signal having a fixed carrier frequency that is assigned to the STB for which the output signal is provided, wherein each STB has a single carrier frequency assigned thereto.

7. The MCSC of claim 6, wherein the STB communicates to the Multi-port Selector Switch, frequency translation block, and combiner utilizing the Digital Satellite Equipment Control System communication protocol.

8. The MCSC of claim 2, further including an automatic gain control block in signal communication with the filter block and the combiner, wherein the automatic gain control block includes a plurality of automatic gain control amplifiers and each automatic gain control amplifier, of the plurality of automatic gain control amplifiers, automatically adjusts the gain of each filtered signal of the plurality of filtered signals.

9. The MCSC of claim 1, wherein the frequency translation block includes a plurality of direct conversion mixers.

10. The MCSC of claim 9, further including a filter block in signal communication with the frequency translation block and the combiner, wherein the filter block includes a plurality of filters and each filter, of the plurality of filters, filters each frequency translated signal of the plurality of frequency translated signals to produce a plurality of filtered signals, wherein each filter of the plurality of filters is a band-pass filter.

11. The MCSC of claim 10, further including an automatic gain control block in signal communication with the filter block and the combiner, wherein the automatic gain control block includes a plurality of automatic gain control amplifiers and each automatic gain control amplifier, of the plurality of automatic gain control amplifiers, automatically adjusts the gain of each filtered signal of the plurality of filtered signals.

12. The MCSC of claim 11, wherein the frequency translation block is in signal communication with a frequency source, wherein the frequency source includes at least one voltage controlled oscillator and at least one phase-lock loop.

13. The MCSC of claim 12, further including an automatic gain control amplifier in signal communication the combiner, wherein the automatic gain control amplifier automatically adjusts the gain of the output signal.

14. The MCSC of claim 12, further including an automatic gain control input block in signal communication with the Multi-port Selector Switch, wherein the automatic gain control input block includes a plurality of automatic gain control amplifiers and each automatic gain control amplifier, of the plurality of automatic gain control amplifiers, automatically adjusts the gain of each input signal of the plurality of input signals.

15. The MCSC of claim 1, wherein the frequency translation block includes a plurality of demodulator and modulator translation sub-modules wherein each demodulator and modulator translation sub-module includes:
 a first downconverter mixer in signal communication with the Multi-port Selector Switch;
 an upconverter mixer; and
 a low pass filter in signal communication with both the first downconverter mixer and the upconverter mixer.

16. The MCSC of claim 15, wherein the first downconverter mixer is in signal communication with a first frequency source, wherein the first frequency source includes at least one voltage controlled oscillator and at least one phase-lock loop.

17. The MCSC of claim 16, wherein the upconverter mixer is in signal communication with a second frequency source.

18. The MCSC of claim 17, wherein the second frequency source includes at least one voltage controlled oscillator and at least one phase-lock loop.

19. The MCSC of claim 17, further including an automatic gain control ("AGC") block in signal communication with the each upconverter mixer of the filter block and the combiner, wherein the AGC block includes a plurality of AGC circuits and each AGC circuit, of the plurality of AGC circuits, automatically adjusts the gain of each filtered signal of the plurality of filtered signals.

20. The MCSC of claim 19, wherein each AGC circuit is an active circuit.

21. The MCSC of claim 19, wherein each AGC circuit is a passive circuit.

22. The MCSC of claim 19, further including a combiner AGC circuit in signal communication the combiner, wherein the combiner AGC circuit automatically adjusts the gain of the single MCSC signal.

23. The MCSC of claim 22, wherein the combiner AGC circuit is an active circuit.

24. The MCSC of claim 22, wherein the combiner AGC circuit is a passive circuit.

25. The MCSC of claim 22, further including an AGC input block in signal communication with the Multi-port Selector Switch, wherein the AGC input block includes a plurality of input AGC circuits and each input AGC circuit, of the plurality of input AGC circuits, automatically adjusts the gain of each input signal of the plurality of input signals.

26. The MCSC of claim 25, wherein each input AGC circuit is an active circuit.

27. The MCSC of claim 25, wherein each input AGC circuit is a passive circuit.

28. The MCSC of claim 25, further including a controller in signal communication with the Multi-port Selector Switch, frequency translation block, combiner, AGC block, combiner AGC circuit, and AGC input block.

29. The MCSC of claim 28, wherein the controller communicates to the Multi-port Selector Switch, frequency translation block, and combiner utilizing the Digital Satellite Equipment Control System communication protocol.

30. The MCSC of claim 1, wherein
 the input signals are received satellite signals that have been passed through a plurality of low-noise block downconverters ("LNBs"), wherein each received satellite signal includes a transponder carrier, and
 the MCSC output signal is passed to the plurality of STBs and the MCSC output signal includes a plurality of transponder carriers, wherein each STB is configured to independently tune to each transponder carrier.

31. The MCSC of claim 30, wherein the combiner is in signal communication with the STBs through a divider.

32. The MCSC of claim 31, wherein the frequency translation block translates each switched output signal of the plurality of switched output signals to the plurality of translated signals, wherein each translated signal has a fixed carrier frequency between 925 to 2,175 MegaHertz ("Mhz").

33. A Multi-carrier Switch Converter ("MCSC") for multiplexing a plurality of input signals received at the MCSC into a single MCSC output signal, the MCSC comprising:
 means for receiving the plurality of input signals and producing a Multi-port Selector Switch output, wherein the Multi-port Selector Switch output includes a plurality of switched output signals;
 means for frequency translating each switched output signal of the plurality of switched output signals to a plurality of translated signals, wherein each translated signal has a fixed carrier frequency that is associated with and exclusive to a predetermined one of a plurality of set top boxes (STBs); and
 means for receiving the plurality of frequency translated signals and combining them to produce the single MCSC signal.

34. The MCSC of claim 33, further including a means for filtering each frequency translated signal of the plurality of frequency translated signals to produce a plurality of filtered translated signals.

35. The MCSC of claim 34, wherein filtering means includes means for low-pass filtering.

36. The MCSC of claim 34, wherein filtering means includes means for high-pass filtering.

37. The MCSC of claim 34, wherein filtering means includes means for band-pass filtering.

38. The MCSC of claim 34, further including an automatic gain control block in signal communication with the filter block and the combiner, wherein the automatic gain control block includes a plurality of automatic gain control amplifiers and each automatic gain control amplifier, of the plurality of automatic gain control amplifiers, automatically adjusts the gain of each filtered signal of the plurality of filtered signals.

39. The MCSC of claim 38, wherein the means for frequency translating includes a plurality of direct conversion mixers.

40. The MCSC of claim 33, wherein
the input signals are received satellite signals that have been passed through a plurality of low-noise block downconverters ("LNBs"), wherein each received satellite signal includes a transponder carrier, and
the MCSC output signal is passed to a plurality of set-top boxes ("STBs") and the MCSC output signal includes a plurality of transponder carriers, wherein each STB is configured to independently tune to each transponder carrier.

41. A method for multiplexing a plurality of input signals received at the Multi-carrier Switch Converter ("MCSC") into a single MCSC output signal, the method comprising:
switching the plurality of input signals into a Multi-port Selector Switch output, wherein the Multi-port Selector Switch output includes a plurality of switched output signals;
frequency translating each switched output signal of the plurality of switched output signals to a plurality of translated signals, wherein each translated signal has a fixed carrier frequency that is associated with and exclusive to a predetermined one of a plurality of set top boxes (STBs); and
combining the plurality of frequency translated signals to produce the single MCSC output signal.

42. The method of claim 41, further including filtering each frequency translated signal of the plurality of frequency translated signals to produce a plurality of filtered signals, and wherein each STB has a single carrier frequency associated therewith.

43. The method of claim 42, further including equalizing each filtered signal of the plurality of filtered signals with an automatic gain control ("AGC") circuit.

44. The method of claim 43, wherein equalizing includes automatically adjusting the gain of each filtered signal of the plurality of filtered signals with a passive AGC circuit.

45. The method of claim 43 wherein equalizing includes automatically adjusting the gain of each filtered signal of the plurality of filtered signals with an active AGC circuit.

46. The method of claim 43, further including equalizing the single MCSC output signal with a combiner automatic gain control ("AGC") circuit.

47. The method of claim 46, wherein the combiner AGC circuit is a passive AGC circuit.

48. The method of claim 46, wherein the combiner AGC circuit is an active AGC circuit.

49. The method of claim 46, further including equalizing the plurality of input signals with an automatic gain control ("AGC") input block, wherein the AGC input block includes a plurality of input AGC circuits.

50. The method of claim 49, wherein each input AGC circuit is a passive AGC circuit.

51. The method of claim 50, wherein each input AGC circuit is an active AGC circuit.

52. The method of claim 49, wherein combining includes combining the plurality of frequency translated signals to produce the single output signal having a specific frequency plan.

53. The method of claim 41, wherein frequency translating includes frequency translating each switched output signal of the plurality of switched output signals to the plurality of translated signals through direct conversion mixing, wherein each translated signal has a fixed carrier frequency.

54. The method of claim 53, further including filtering each frequency translated signal of the plurality of frequency translated signals to produce a plurality of filtered signals, wherein each filter of the plurality of filters is a band-pass filter.

55. The method of claim 54, further including an automatic gain control equalizing each filtered signal of the plurality of filtered signals.

56. The method of claim 55, wherein the frequency translating includes utilizing at least one voltage controlled oscillator and at least one phase-lock loop.

57. The method of claim 41, wherein the frequency translating includes:
downconverter mixing the plurality of switched output signals to produce a plurality of
downconverted switched signals;
filtering the downconverted switched signals; and
upconverter mixing the filtered downconverted switched signals.

58. The method of claim 57, wherein downconverter mixing includes utilizing a frequency source having at least one voltage controlled oscillator and at least one phase-lock loop.

59. The method of claim 58, wherein upconverter mixing a second frequency source.

60. The method of claim 59, wherein the second frequency source includes at least one voltage controlled oscillator and at least one phase-lock loop.

* * * * *